US006249641B1

(12) United States Patent
Yokota

(10) Patent No.: US 6,249,641 B1
(45) Date of Patent: Jun. 19, 2001

(54) RECORDING MEDIUM, RECORDING AND/ OR REPRODUCING APPARATUS AND RECORDING AND/OR REPRODUCING METHOD

(75) Inventor: Teppei Yokota, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 08/278,612

(22) Filed: Jul. 20, 1994

(30) Foreign Application Priority Data

Jul. 23, 1993 (JP) .................................................. 5-202120
May 30, 1994 (JP) .................................................. 6-137807

(51) Int. Cl.[7] .................................................. H04N 5/928
(52) U.S. Cl. .............................. 386/94; 386/96; 386/106
(58) Field of Search .................................... 358/342, 335, 358/341, 343, 310; 360/9.1, 19.1, 60; 386/94, 96, 106; H04N 5/76, 5/92, 5/91, 9/79, 5/928

(56) References Cited

U.S. PATENT DOCUMENTS 4,489,351 * 12/1984 d'Alayer de Costemore d'Arc . 358/335
4,777,537 * 10/1988 Ueno et al. ......................... 358/342
5,166,804 * 11/1992 Takahashi ............................ 358/341
5,258,852 * 11/1993 Kajmijima ........................... 358/342
5,309,249 * 5/1994 Ishii .................................... 358/342
5,331,423 * 7/1994 Ota et al. ............................ 358/342
5,448,371 * 9/1995 Choi .................................... 358/335

FOREIGN PATENT DOCUMENTS 0 165 320 A1 12/1985 (EP) ............................... G11B/7/00
0 406 021 A2 1/1991 (EP) ............................... G11B/7/00
0 472 343 A1 2/1992 (EP) ............................... G11B/7/00
0 521 487 A1 1/1993 (EP) ............................... G11B/7/00
0 613 144 A2 8/1994 (EP) ............................... G11B/27/28
2225147 * 5/1990 (GB) ............................... H04N/5/76
2116058 4/1990 (JP) ............................... G11B/20/00
2257486 10/1990 (JP) ............................... G11B/2/10
366272 * 3/1991 (JP) ............................... H04N/5/92
4017160 1/1992 (JP) ............................... G11B/19/04

OTHER PUBLICATIONS

"The Full Motion System for CD–1" by Jan van der Meer of Philips Consumer Electronics, pp. 910–920 from vol. 4, Nov. 1992 issue of *IEEE Transactions on Consumer Electronics*.

* cited by examiner

*Primary Examiner*—Thai Tran
(74) *Attorney, Agent, or Firm*—Andrew V. Smith

(57) ABSTRACT

A recording medium, as well as the apparatus and method for recording and reproducing it, which includes a recording area in which either only audio data or an intermixture of video data and corresponding audio data are recorded, a first management data area stored with first management data for permitting a recording or reproducing operation of only the audio data and inhibiting a reproducing or recording operation of the video data when only the audio data are being recorded in or reproduced from the recording area, and a second management data area stored with second management data for controlling a recording or reproducing operation of the intermixture of the audio data and the video data when the intermixture of the audio data and the video data are being recorded in or reproduced from the recording area.

32 Claims, 27 Drawing Sheets

FIG. 4

| | | 16 BIT | | 16 BIT | | |
|---|---|---|---|---|---|---|
| | | MSB LSB | MSB LSB | MSB LSB | MSB LSB | |
| | | 00000000 | 11111111 | 11111111 | 11111111 | 0 |
| | | 11111111 | 11111111 | 11111111 | 11111111 | 1 |
| | | 11111111 | 11111111 | 11111111 | 00000000 | 2 |
| HEADER | | CLUSTERH | CLUSTERL | 00000000 | 00000010 | 3 |
| | | 00000000 | 00000000 | 00000000 | 00000000 | 4 |
| | | 00000000 | 00000000 | 00000000 | 00000000 | 5 |
| | | "M" | "I" | "N" | "I" | 6 |
| | | DISC TYPE | REC POWER | FIRST TNO | LAST TNO | 7 |
| | | READ-OUT START ADDRESS (RO_A) | | | USED SECTORS | 8 |
| | | POWER CAL AREA START ADDRESS (PC_A) | | | 00000000 | 9 |
| | | U-TOC START ADDRESS (UST_A) | | | 00000000 | 10 |
| | | RECORDABLE USER AREA START ADDRESS (RST_A) | | | 00000000 | 11 |
| CORRESPONDING TABLE INDICATION DATA PORTION | | 00000000 | P-TN01 | P-TN02 | P-TN03 | 12 |
| | | P-TN04 | P-TN05 | P-TN06 | P-TN07 | 13 |
| | | | | | | |
| | | P-TN0248 | P-TN0249 | P-TN0250 | P-TN0251 | 74 |
| | | P-TN0252 | P-TN0253 | P-TN0254 | P-TN0255 | 75 |
| | | 00000000 | 00000000 | 00000000 | 00000000 | 76 |
| | | 00000000 | 00000000 | 00000000 | 00000000 | 77 |
| MANAGING TABLE PORTION (255 PART TABLE) | (01) | START ADDRESS | | | TRACK MODE | 78 |
| | | END ADDRESS | | | 00000000 | 79 |
| | (02) | START ADDRESS | | | TRACK MODE | 80 |
| | | END ADDRESS | | | 00000000 | 81 |
| | (03) | START ADDRESS | | | TRACK MODE | 82 |
| | | END ADDRESS | | | 00000000 | 83 |
| | | | | | | |
| | (FC) | START ADDRESS | | | TRACK MODE | 580 |
| | | END ADDRESS | | | 00000000 | 581 |
| | (FD) | START ADDRESS | | | TRACK MODE | 582 |
| | | END ADDRESS | | | 00000000 | 583 |
| | (FE) | START ADDRESS | | | TRACK MODE | 584 |
| | | END ADDRESS | | | 00000000 | 585 |
| | (FF) | START ADDRESS | | | TRACK MODE | 586 |
| | | END ADDRESS | | | 00000000 | 587 |

FIG. 5

| | | 16 BIT | | 16 BIT | | |
|---|---|---|---|---|---|---|
| | | MSB LSB | MSB LSB | MSB LSB | MSB LSB | |
| | | 00000000 | 11111111 | 11111111 | 11111111 | 0 |
| | | 11111111 | 11111111 | 11111111 | 11111111 | 1 |
| | | 11111111 | 11111111 | 11111111 | 00000000 | 2 |
| HEADER | | CLUSTERH | CLUSTERL | 00000000 | 00000010 | 3 |
| | | 00000000 | 00000000 | 00000000 | 00000000 | 4 |
| | | 00000000 | 00000000 | 00000000 | 00000000 | 5 |
| | | 00000000 | 00000000 | 00000000 | 00000000 | 6 |
| | | MAKER CODE | MODEL CODE | FIRST TNO | LAST TNO | 7 |
| | | 00000000 | 00000000 | 00000000 | USED SECTORS | 8 |
| | | 00000000 | 00000000 | 00000000 | 00000000 | 9 |
| | | 00000000 | 00000000 | 00000000 | DISC SERIAL NO | 10 |
| CORRESPONDING TABLE INDICATION DATA PORTION | | DISC | ID | P-DFA | P-EMPTY | 11 |
| | | P-FRA | P-TN01 | P-TN02 | P-TN03 | 12 |
| | | P-TN04 | P-TN05 | P-TN06 | P-TN07 | 13 |
| | | | | | | |
| | | | | | | |
| | | P-TN0248 | P-TN0249 | P-TN0250 | P-TN0251 | 74 |
| | | P-TN0252 | P-TN0253 | P-TN0254 | P-TN0255 | 75 |
| | | 00000000 | 00000000 | 00000000 | 00000000 | 76 |
| | | 00000000 | 00000000 | 00000000 | 00000000 | 77 |
| MANAGING TABLE PORTION (255 PART TABLE) | (01) | START ADDRESS | | | TRACK MODE | 78 |
| | | END ADDRESS | | | LINK INFORMATION | 79 |
| | (02) | START ADDRESS | | | TRACK MODE | 80 |
| | | END ADDRESS | | | LINK INFORMATION | 81 |
| | (03) | START ADDRESS | | | TRACK MODE | 82 |
| | | END ADDRESS | | | LINK INFORMATION | 83 |
| | | | | | | |
| | | | | | | |
| | (FC) | START ADDRESS | | | TRACK MODE | 580 |
| | | END ADDRESS | | | LINK INFORMATION | 581 |
| | (FD) | START ADDRESS | | | TRACK MODE | 582 |
| | | END ADDRESS | | | LINK INFORMATION | 583 |
| | (FE) | START ADDRESS | | | TRACK MODE | 584 |
| | | END ADDRESS | | | LINK INFORMATION | 585 |
| | (FF) | START ADDRESS | | | TRACK MODE | 586 |
| | | END ADDRESS | | | LINK INFORMATION | 587 |

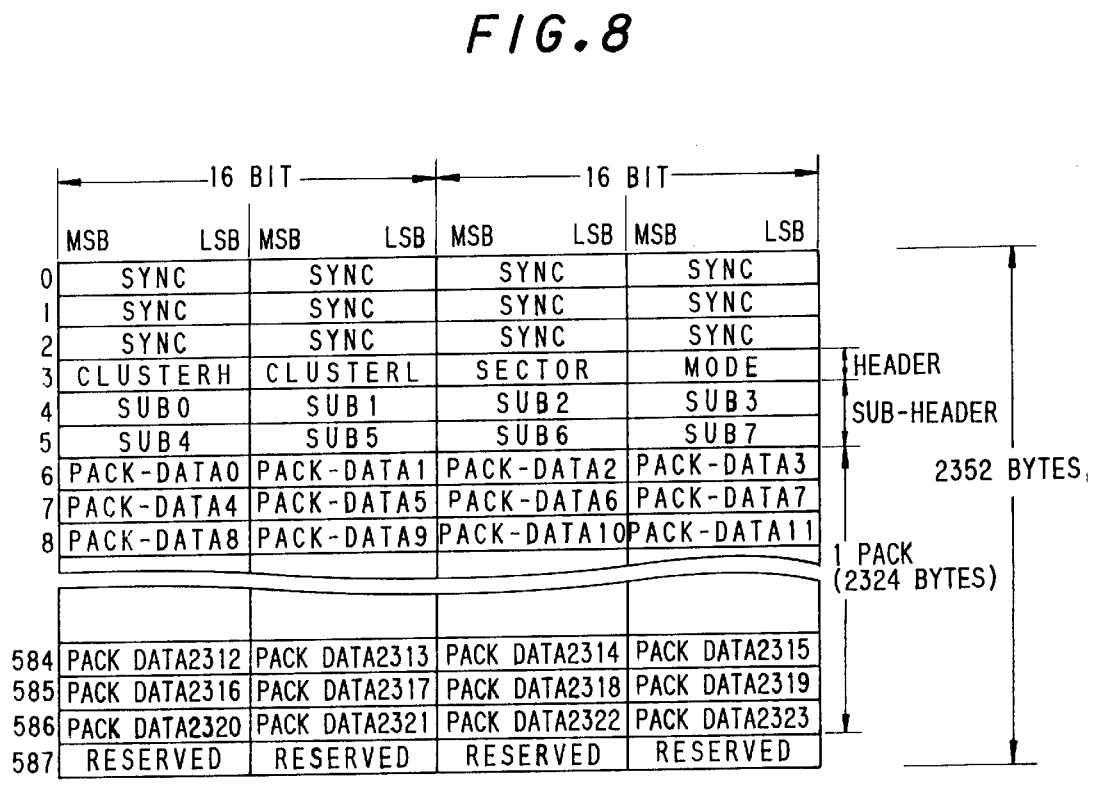

F/G.8

| | 16 BIT | | 16 BIT | |
|---|---|---|---|---|
| | MSB LSB | MSB LSB | MSB LSB | MSB LSB |
| 0 | SYNC | SYNC | SYNC | SYNC |
| 1 | SYNC | SYNC | SYNC | SYNC |
| 2 | SYNC | SYNC | SYNC | SYNC |
| 3 | CLUSTERH | CLUSTERL | SECTOR | MODE |
| 4 | SUB0 | SUB1 | SUB2 | SUB3 |
| 5 | SUB4 | SUB5 | SUB6 | SUB7 |
| 6 | PACK-DATA0 | PACK-DATA1 | PACK-DATA2 | PACK-DATA3 |
| 7 | PACK-DATA4 | PACK-DATA5 | PACK-DATA6 | PACK-DATA7 |
| 8 | PACK-DATA8 | PACK-DATA9 | PACK-DATA10 | PACK-DATA11 |
| | | | | |
| 584 | PACK DATA2312 | PACK DATA2313 | PACK DATA2314 | PACK DATA2315 |
| 585 | PACK DATA2316 | PACK DATA2317 | PACK DATA2318 | PACK DATA2319 |
| 586 | PACK DATA2320 | PACK DATA2321 | PACK DATA2322 | PACK DATA2323 |
| 587 | RESERVED | RESERVED | RESERVED | RESERVED |

HEADER (row 3)

SUB-HEADER (rows 4–5)

1 PACK (2324 BYTES) (rows 6–586)

2352 BYTES (rows 0–587)

FIG. 14B 1 PACK OF PICTURE SECTOR WITH SYSTEM HEADER

FIG. 14C 1 PACK OF PICTURE SECTOR

FIG. 14D 1 PACK OF PICTURE SECTOR

PACKET HEADER: PACKET START CODE (3) | ID (1) | PACKET LENGTH (2) | STD BUFFER SCALE (1) | STD BUFFER SIZE (1) | PTS (5) | DTS (5)

PACKET START CODE (3) | ID (1) | PACKET LENGTH (2)

FIG. 22

CORRESPONDING TABLE INDICATION DATA PORTION
(TABLE POINTER)

| | | |
|---|---|---|
| P-DFA: 00h | P-EMPTY:(07h) | P-FRA:(06h) |
| P-TN01:(01h) | P-TN02:(02h) | P-TN03:(03h) |
| P-TN04:(04h) | P-TN05:(05h) | P-TN06:00h |
| P-TN07:00h | P-TN08:00h | P-TN09:00h |
| | | |
| P-TN0253:00h | P-TN0254:00h | P-TN0255:00h |

MANAGING TABLE PORTION (255 PART TABLE)

| | START ADDRESS | END ADDRESS | TRACK MODE | LINK INFORMATION |
|---|---|---|---|---|
| (01h) | $A_{20}$ | $A_{21}$ | | 00h |
| (02h) | $A_{22}$ | $A_{23}$ | | 00h |
| (03h) | $A_{24}$ | $A_{25}$ | | 00h |
| (04h) | $A_{26}$ | $A_{27}$ | | 00h |
| (05h) | $A_{28}$ | $A_{29}$ | | 00h |
| (06h) | $A_{30}$ | $A_{31}$ | | 00h |
| (07h) | 00h | 00h | | (08h) |
| (08h) | 00h | 00h | | (09h) |
| (09h) | 00h | 00h | | (0Ah) |
| (0Ah) | 00h | 00h | | (0Bh) |
| (0Bh) | 00h | 00h | | (0Ch) |
| | | | | |
| (FEh) | 00h | 00h | | (FFh) |
| (FFh) | 00h | 00h | | 00h |

FIG. 23

CORRESPONDING TABLE INDICATION DATA PORTION
(TABLE POINTER)

| | | |
|---|---|---|
| P-DFA:(03h) | P-EMPTY:(07h) | P-FRA:(06h) |
| P-TN01:(01h) | P-TN02:(02h) | P-TN03:(04h) |
| P-TN04:(05h) | P-TN05:00h | P-TN06:00h |
| P-TN07:00h | P-TN08:00h | P-TN09:00h |
| | | |
| | | |
| P-TN0253:00h | P-TN0254:00h | P-TN0255:00h |

MANAGING TABLE PORTION (255 PART TABLE)

| | START ADDRESS | END ADDRESS | TRACK MODE | LINK INFORMATION |
|---|---|---|---|---|
| (01h) | $A_{20}$ | $A_{21}$ | | 00h |
| (02h) | $A_{22}$ | $A_{23}$ | | 00h |
| (03h) | $A_{24}$ | $A_{25}$ | | 00h |
| (04h) | $A_{26}$ | $A_{27}$ | | 00h |
| (05h) | $A_{28}$ | $A_{29}$ | | 00h |
| (06h) | $A_{30}$ | $A_{31}$ | | 00h |
| (07h) | 00h | 00h | | (08h) |
| (08h) | 00h | 00h | | (09h) |
| (09h) | 00h | 00h | | (0Ah) |
| (0Ah) | 00h | 00h | | (0Bh) |
| (0Bh) | 00h | 00h | | (0Ch) |
| | | | | |
| | | | | |
| (FEh) | 00h | 00h | | (FFh) |
| (FFh) | 00h | 00h | | 00h |

FIG. 24

CORRESPONDING TABLE INDICATION DATA PORTION
(TABLE POINTER)

| | | |
|---|---|---|
| P-DFA:(03h) | P-EMPTY:(07h) | P-FRA:(06h) |
| P-TN01:(01h) | P-TN02:(02h) | P-TN03:(04h) |
| P-TN04: 00h | P-TN05:00h | P-TN06:00h |
| P-TN07: 00h | P-TN08:00h | P-TN09:00h |
| | | |
| | | |
| P-TN0253:00h | P-TN0254:00h | P-TN0255:00h |

MANAGING TABLE PORTION (255 PART TABLE)

| | START ADDRESS | END ADDRESS | TRACK MODE | LINK INFORMATION |
|---|---|---|---|---|
| (01h) | $A_{20}$ | $A_{21}$ | | 00h |
| (02h) | $A_{22}$ | $A_{23}$ | | 00h |
| (03h) | $A_{24}$ | $A_{25}$ | | (05h) |
| (04h) | $A_{26}$ | $A_{27}$ | | 00h |
| (05h) | $A_{28}$ | $A_{29}$ | | 00h |
| (06h) | $A_{30}$ | $A_{31}$ | | 00h |
| (07h) | 00h | 00h | | 08h |
| (08h) | 00h | 00h | | (09h) |
| (09h) | 00h | 00h | | (0Ah) |
| (0Ah) | 00h | 00h | | (0Bh) |
| (0Bh) | 00h | 00h | | (0Ch) |
| | | | | |
| | | | | |
| (FEh) | 00h | 00h | | (FFh) |
| (FFh) | 00h | 00h | | 00h |

FIG. 25

CORRESPONDING TABLE INDICATION DATA PORTION (TABLE POINTER)

| | | |
|---|---|---|
| P-DFA:(01h) | P-EMPTY:(07h) | P-FRA:(06h) |
| P-TN01: 00h | P-TN02: 00h | P-TN03: 00h |
| P-TN04: 00h | P-TN05:00h | P-TN06:00h |
| P-TN07:00h | P-TN08:00h | P-TN09:00h |
| | | |
| | | |
| P-TN0253:00h | P-TN0254:00h | P-TN0255:00h |

MANAGING TABLE PORTION (255 PART TABLE)

| | START ADDRESS | END ADDRESS | TRACK MODE | LINK INFORMATION |
|---|---|---|---|---|
| (01h) | $A_{20}$ | $A_{29}$ | | 00h |
| (02h) | 00h | 00h | | 00h |
| (03h) | 00h | 00h | | 00h |
| (04h) | 00h | 00h | | 00h |
| (05h) | 00h | 00h | | 00h |
| (06h) | $A_{30}$ | $A_{31}$ | | 00h |
| (07h) | 00h | 00h | | (08h) |
| (08h) | 00h | 00h | | (09h) |
| (09h) | 00h | 00h | | (0Ah) |
| (0Ah) | 00h | 00h | | (0Bh) |
| (0Bh) | 00h | 00h | | (0Ch) |
| | | | | |
| | | | | |
| (FEh) | 00h | 00h | | (FFh) |
| (FFh) | 00h | 00h | | 00h |

FIG. 27

CORRESPONDING TABLE INDICATION DATA PORTION
(TABLE POINTER)

| | | |
|---|---|---|
| P-DFA: 00h | P-EMPTY:(07h) | P-FRA:(06h) |
| P-TN01:(01h) | P-TN02:(02h) | P-TN03:(03h) |
| P-TN04:(04h) | P-TN05:(05h) | P-TN06:00h |
| P-TN07:00h | P-TN08:00h | P-TN09:00h |
| | | |
| P-TN0253:00h | P-TN0254:00h | P-TN0255:00h |

MANAGING TABLE PORTION (255 PART TABLE)

| | START ADDRESS | END ADDRESS | TRACK MODE | LINK INFORMATION |
|---|---|---|---|---|
| (01h) | $A_{20}$ | $A_{21}$ | | 00h |
| (02h) | $A_{22}$ | $A_{23}$ | | 00h |
| (03h) | $A_{24}$ | $A_{25}$ | | 00h |
| (04h) | $A_{26}$ | $A_{27}$ | | 00h |
| (05h) | $A_{28}$ | $A_{29}$ | | 00h |
| (06h) | $A_{30}$ | $A_{31}$ | | 00h |
| (07h) | 00h | 00h | | (08h) |
| (08h) | 00h | 00h | | (09h) |
| (09h) | 00h | 00h | | (0Ah) |
| (0Ah) | 00h | 00h | | (0Bh) |
| (0Bh) | 00h | 00h | | (0Ch) |
| | | | | |
| (FEh) | 00h | 00h | | (FFh) |
| (FFh) | 00h | 00h | | 00h |

RECORDING MEDIUM, RECORDING AND/OR REPRODUCING APPARATUS AND RECORDING AND/OR REPRODUCING METHOD

BACKGROUND OF THE INVENTION

1. Field of the Invention

This invention relates to a recording medium, particularly to the type in which managing data for managing data recorded in a recording area are recorded, and a recording or reproducing apparatus and method for such a recording medium.

2. Description of the Related Art

A recording apparatus, a reproducing apparatus and a recording medium such as a magneto-optical disc with which musical pieces and general data can be recorded and reproduced are known. Particularly, those magneto-optical discs which enable a user to not only reproduce information therefrom, but also record sounds such as music, etc. thereon have been recently made public.

A recording and/or reproducing apparatus using such a magneto-optical disc has been generally used to record/reproduce audio signals of music, etc., and this type of recording and/or reproducing apparatus is expected to enable an user to record/reproduce video (image) data in synchronism with sounds such as music, etc.

If video data are also considered to be recorded and/or reproduced together with audio data using a recording and/or reproducing apparatus which is originally developed for recording and reproduction of sounds (audio data), there would occur a problem that it is difficult to keep compatibility with a recording medium on which only audio data are recorded. That is, not only a system which is capable of recording and reproducing both of pictures (images) and music is merely provided, but also it is required to keep such compatibility that, for a recording medium on which video data are newly recorded, only audio data are recordable/reproducible using a recording and/or reproducing apparatus for ordinary magneto-optical discs to enjoy music, etc. while both of audio data and video data can be simultaneously reproduced using a recording and/or reproducing apparatus having a video input and output function to enjoy both of pictures and music like a Karaoke with pictures or a video equipment.

Further, in this type of recording and/or reproducing apparatus, there is a case where no reproduction can be performed by any one other than special persons, for example, when high secrecy is required for recorded data. In some cases, it is required that prescribed video or audio data can be reproduced by only those persons who know identification numbers for these data.

SUMMARY OF THE INVENTION

It is, therefore, an object of the present invention to provide a recording medium which resolves the above-mentioned problem.

It is another object of the present invention to provide a disc-shaped recording medium which resolves the above-mentioned problem.

It is a further object of the present invention to provide a recording and/or reproducing apparatus of a recording medium which resolves the above-mentioned problem.

It is another object of the present invention to provide a recording and/or reproducing apparatus of a disc-shaped recording medium which resolves the above-mentioned problem.

It is still another object of the present invention to provide a reproducing apparatus of a disc-shaped recording medium which resolves the above-mentioned problem.

It is yet another object of the present invention to provide a recording or reproducing method of a disc-shaped recording medium which resolves the above-mentioned problem.

According to the present invention, there is provided a recording medium including a recording area, a first managing data area and a second managing area. In the recording area are recorded only audio data, or an intermixture of audio data and video data. In the first managing area are recorded first managing data for controlling a recording or reproducing operation of audio data for the recording area when only the audio data are recorded in or reproduced from the recording area. In the second managing data area are recorded second managing data for controlling a recording or reproducing operation of the audio data for the recording area when both of audio data and video data are recorded in or reproduced from the recording area.

According to the present invention the recording area may be recorded only compressed audio data, or intermixture of compressed audio data and compressed video data in a discrete or continuous form. The first managing data control a recording or reproducing operation of audio data for the recording area so that expanded audio data to be output when only the audio data are recorded in or reproduced from the recording area are output continuously. The second managing data control a recording or reproducing operation of the audio data for the recording area so that expanded audio data and expanded video data to be output when both of the audio data and the video data are recorded in or reproduced from the recording area are output continuously.

According to the present invention, there is further provided a recording and/or reproducing apparatus for such a recording medium. The apparatus includes first and second compandors, a storing unit, a data transforming unit, a head unit and a control unit. The first compandor compresses audio signals input thereto, and expands audio data read out from the recording medium. The second compandor compresses video signals input thereto, and expands video data read out from the recording medium. The storing unit temporarily stores therein both of the audio data and the video data which are output from the first and second compandors respectively, and temporarily stores therein both of the audio data and the video data which are read out from the recording medium. The data transforming unit transforms the audio data and the video data read out from the storing unit into recording data. The head unit records the recording data supplied from the transforming unit on the recording medium, and reads out data recorded on the recording medium. The control unit controls the recording or reproducing operation of data in or from the recording medium by the head unit on the basis of the first and second managing data read out by the head unit.

According to the present invention, the second managing data contains reproduction inhibiting data. The control unit is supplied with the first and second managing data which are read out by the head unit, and controls the recording or reproducing operation in or from the recording medium by the head unit on the basis of the first and second managing data. On the basis of the first managing data, the control unit carries out a reproducing operation for only a part of the recording area on the recording medium, on which the audio data are recorded. Further, on the basis of the second managing data and the reproduction inhibiting data of the second managing data, the control unit controls the head unit to partially read out the recording area on the recording medium.

According to another embodiment of the present invention, there is provided a reproducing apparatus of a disc-shaped recording medium. The disc-shaped recording medium includes a recording area in which only audio data or an intermixture of audio data and video data are recorded, a first managing data area stored with first managing data for controlling a recording or reproducing operation of the audio data for the recording area when only the audio data are recorded in or reproduced from the recording area, and a second managing data area stored with second managing data for controlling a recording or reproducing operation of both of the audio data and the video data for the recording area when both of the audio data and the video data are recorded in or reproduced from the recording area. The apparatus includes a head, a decoder, a memory, first and second compandors and a controller. The head reads out data which are recorded on the disc-shaped recording medium with being compressed. The decoder decodes the data read out by the head. The memory temporarily stores the video data and the video data which are output from the decoder. The first compandor expands the audio data output from the memory. The second compandor expands the video data output from the memory. The controller controls the reproducing operation of the disc-shaped recording medium by the head on the basis of the first and second managing data which are read out by the head.

According to the present invention, there is provided a reproducing method of a disc-shaped recording medium. The disc-shaped recording medium includes a recording area on which only audio data or intermixture of audio data and video data are recorded, a first managing data area stored with first managing data for controlling a recording or reproducing operation of the audio data for the recording area when only the audio data are recorded in or reproduced from the recording area, and a second managing data area stored with second managing data for controlling a recording or reproducing operation of both of the audio data and the video data for the recording area when an intermixture of the audio data and the video data are recorded in or reproduced from the recording area. The reproducing method comprises the steps of reading out the first managing data from the disc-shaped recording medium with the head, and continuously reading out a video-data recorded portion and an audio-data recorded portion in the recording area on the basis of the second managing data with the head.

According to the present invention, there is also provided a recording method of a disc-shaped recording medium. The disc-shaped recording medium includes a recording area on which only audio data or intermixture of audio data and video data are recorded, a first managing data area stored with first managing data for controlling a recording or reproducing operation of the audio data for the recording area when only the audio data are recorded in or reproduced from the recording area, and a second managing data area stored with second managing data for controlling a recording or reproducing operation of both of the audio data and the video data for the recording area when both of the audio data and the video data are recorded in or reproduced from the recording area. The recording method comprises the steps of writing reproduction-inhibiting data, which are input from an input unit and inhibit the reproduction of a specific portion of the recording area on the disc-shaped recording medium, into the second managing data which are read out from the disc-shaped recording medium by the head unit and stored in the storing unit together with the first managing data, and recording the first and second managing data read out from the storing unit into the first and second managing data areas respectively with the head unit.

According to the present invention, the first managing data for audio data and the second managing data for recording and/or reproducing both of audio data and video data are provided on the recording medium, whereby both of a recording medium on which only audio data are recorded and a recording medium on which audio data and video data are recorded while intermixed with each other can be compatibly recorded and/or reproduced using a single recording and/or reproducing apparatus.

According to the present invention, the reproduction-inhibiting data are contained in the second managing data, whereby an area which is managed by the first managing data can be normally recorded or reproduced, and areas other than a specific area in the recording area can be reproduced by the reproduction-inhibiting data of the second managing data.

BRIEF DESCRIPTION OF THE DRAWINGS

FIGS. 3A through 3D are diagrams showing a track structure of a magnetooptical disc, wherein FIG. 3A shows the track structure of the magnetooptical disc, FIG. 3B shows the data structure of one cluster, FIG. 3C shows the data structure of an even sector, and FIG. 3D shows the data structure of an odd sector;

FIG. 4 shows the construction of P-TOC information;

FIG. 5 shows the construction of U-TOC information;

FIG. 8 shows a format of a sector on which video data are recorded;

FIGS. 10A through 10C are diagrams showing video data compressed by MPEG, wherein FIG. 10A shows the data structure of one frame, FIG. 10B is a diagram showing generation of P picture, and FIG. 10C is a diagram showing generation of B picture;

FIGS. 11A through 11B are diagrams showing a data stream of video data by MPEG system, wherein FIG. 11A shows an arrangement state in frame order, and FIG. 11B shows a data stream of video data;

FIGS. 14A through 14E are diagrams showing video data, wherein FIG. 14A shows the data structure of a sector on which video data are recorded, FIG. 14B shows the data structure of a sector $V_{sh}$ on which video data at the head position are recorded, FIG. 14C shows the data structure of a sector V on which video data subsequent to the sector $V_{sh}$ are recorded, and FIGS. 14D through 14E show the data structure of a sector V located at the last position of a track;

FIGS. 16A and 16B show the data structure of a packet header of a sector on which video data are recorded, wherein FIG. 16A shows the data structure of a packet header of the sector $V_{sh}$, and FIG. 16B shows the data structure of a packet header of the sector V;

FIG. 22 shows an ordinary U-TOC sector 0 or a sector 6 in which no reproduction inhibiting instruction is set;

FIG. 23 shows U-TOC sector 0 or sector 6 when a reproduction inhibiting instruction is set;

FIG. 24 shows U-TOC sector 0 or sector 6 when a reproduction inhibiting instruction is set;

FIG. 25 shows U-TOC sector or sector 6 when a reproduction inhibiting instruction is set;

FIG. 27 shows U-TOC sector 5 in which an ID number demand is set; and

DETAILED DESCRIPTION OF THE PREFERRED EMBODIMENTS

The recording medium, the recording and/or reproducing apparatus for the recording medium and the recording and/or reproducing method for the recording medium according to this invention will be described in detail with reference to the accompanying drawings. In the following embodiments, a magnetooptical disc is used as a recording medium, and this invention will be described using a disc recording and/or reproducing apparatus capable of recording and/or reproducing audio data and video data in and/or from the magnetooptical disc.

The preferred embodiment of this invention will be described along the following sequential items.

1) Construction of a disc recording and/or reproducing apparatus usable for both of video data and audio data (pictures and sounds);

2) Construction of a disc recording and/or reproducing apparatus usable for only audio data;

3) Track structure of a disc;

4) P-TOC format on a disc;

5) U-TOC format on a disc;

6) Audio data sector structure of a disc;

7) Video data sector structure of a disc;

8) Video data generation system;

9) Track structure having intermixture of audio data and video data;

10) Video data format

11) Recording and reproduction managing system;

12) Management system for obtaining reproduction inhibiting portion by only ordinary U-TOC sector;

13) Reproduction system when reproduction inhibiting portion is obtained by only ordinary U-TOC sector;

14) Management system when ID demand U-TOC sector is used; and

15) Reproduction system when ID demand U-TOC sector is used.

<1. Construction of disc recording and/or reproducing apparatus usable for both of video data and audio data>

Figure 1:
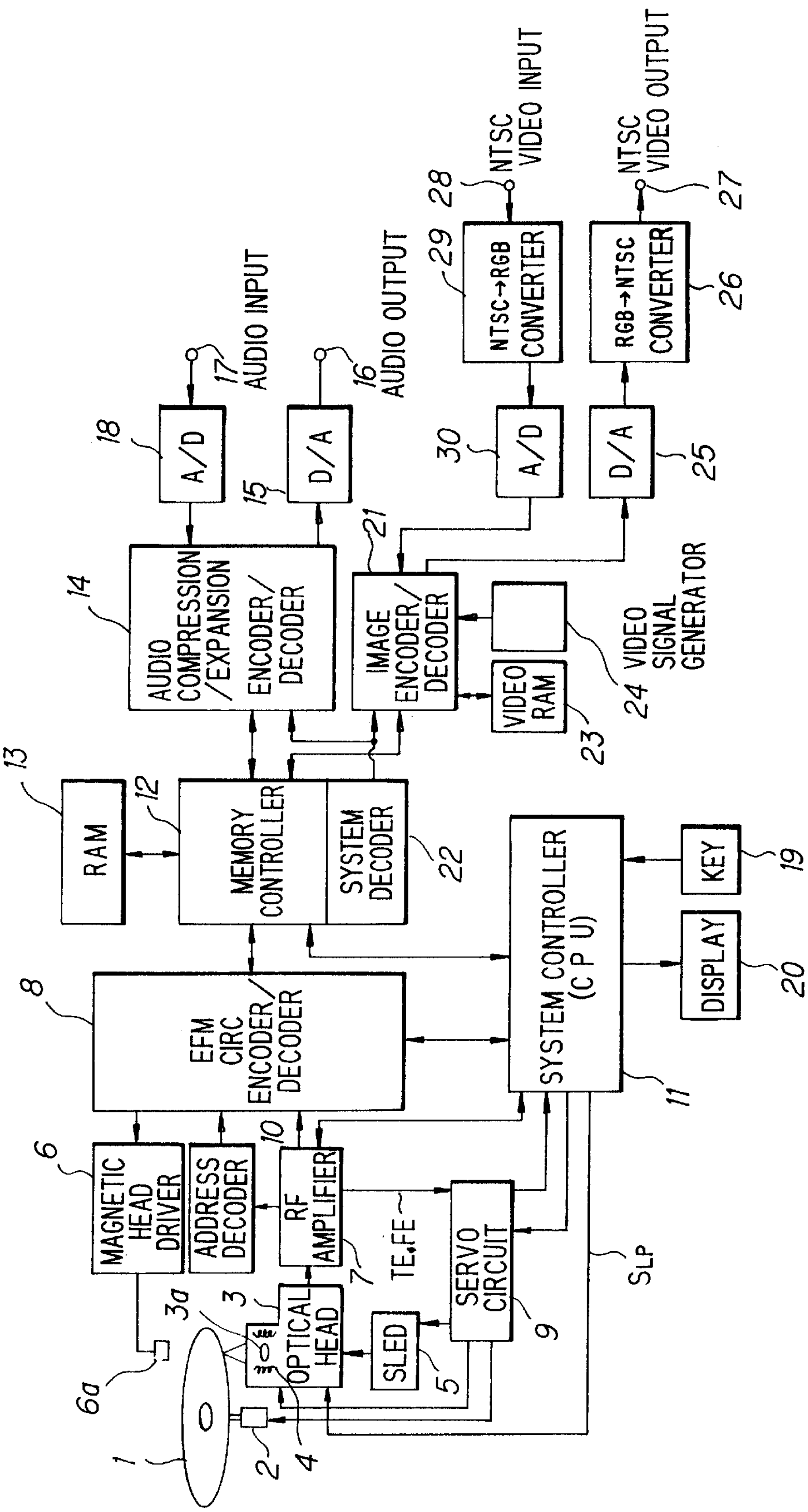
FIG. 1 is a block diagram showing the construction of a disc recording and/or reproducing apparatus according to an embodiment of this invention, which is capable of processing video data and audio data.

FIG. 1 shows the construction of a disc recording and/or reproducing apparatus of an embodiment according to this invention.

In FIG. 1, reference numeral 1 represents a magnetooptical disc on which audio data and video data are recorded while intermixed with each other in a time division multiplex mode, and the magnetooptical disc is rotated at a constant linear velocity by a spindle motor 2. Reference numeral 3 represents an optical head for irradiating a light beam onto the magnetooptical disc 1 in a recording/reproducing operation. The optical head 3 outputs a light beam having a high level to heat a recording track to a Curie temperature in the recording operation, and also outputs a light beam having relatively low level to detect data from reflected light using the magnetic Kerr effect in the reproducing operation Accordingly, the optical head 3 is equipped with a laser diode serving as a light source, an optical system comprising a polarization beam splitter, an objective lens, etc., and a detector for detecting a reflected light. An objective lens 3a is supported by an actuator 4 so as to be displaceable in a radial direction of the disc and in such directions that it is approached to the disc and goes away from the disc.

Reference numeral 6a represents a magnetic head for applying to the magnetooptical disc a perpendicular magnetic field which is modulated by data supplied thereto, and it is disposed so as to face the optical head 3 through the magnetooptical disc 1. The whole optical head 3 and the magnetic head 6a are supported by a sled mechanism 5 so as to be movable in a radial direction of the disc.

Data which are detected from the magnetooptical disc 1 by the optical head 3 in the reproducing operation are supplied to the RF amplifier 7. The RF amplifier 7 extracts a reproduced RF signal, a tracking error signal, a focus error signal, absolute position data, address data, a focus monitor signal, etc. from the supplied data on the basis of a calculation processing of the supplied data. The absolute position data are beforehand recorded in a wobbled pre-groove form on the magnetooptical disc 1. The extracted reproduced RF signal is supplied to an encoder/decoder 8. The tracking error signal and the focus error signal are supplied to a servo circuit 9. The address data are supplied to an address encoder/decoder 10, and the absolute position data and the focus monitor signal are supplied to a system controller 11 which comprises a microcomputer, for example.

The servo circuit 9 generates various kinds of servo signals on the basis of the tracking error signal, the focus error signal and a track jump instruction, a seek instruction, rotational velocity detection data of the spindle motor 2, etc. which are supplied from the system controller 11, and controls the actuator 4 and the sled mechanism 5 on the basis of these signals, thereby performing focus and tracking control. Further, the servo circuit 9 also controls the spindle motor 2 to rotate at a constant angular velocity (CAV) or at a constant linear velocity (CLV).

The reproduced RF signal is subjected to decode processing such as EFM, CIRC, etc. in the encoder/decoder 8, and then temporarily stored in a buffer memory 13. The read-out operation of data, audio data and video data from the magnetooptical disc 1 by the optical head 3 and the transfer operation of reproduced data in a system including elements from the optical head 3 to the buffer memory are performed at 1.41 Mbit/sec, for example.

The data written in the buffer memory 13 are read out from the buffer memory 13 at such a timing that the reproduced data are transferred, for example, at 0.3 Mbit/sec. With respect to audio data, the audio data read out from the buffer memory 13 are supplied to an encoder/decoder 14 which performs an audio compression/expansion processing. In the encoder/decoder 14, the audio data are subjected to a reproduced signal processing such as a decode processing for the audio compression processing, etc., then converted to analog audio signals in a D/A converter 15, and then output to a prescribed amplifying circuit from a terminal 16 of the D/A converter 15. For example, the analog signals output from the D/A converter 15 are output as L and R audio signals from the terminal 16.

On the other hand, with respect to video data, the video data read out from the buffer memory 13 are supplied to an encoder/decoder 21 for image signals by a main controller 12. The encoder/decoder 21 is designed to perform an encode processing and a decoding processing which are conformable to MPEG (Moving Picture Coding Experts Group) system for example. Reference numeral 23 represents a video RAM for holding video data in the encode processing and the decoding processing, and reference numeral 24 represents a video signal generator.

Video signals (R, G, B video signals) which are decoded by the encoder/decoder 21 are converted to analog signals in a D/A converter 25, then converted to NTSC video signals, for example composite video signals of NTSC system by a converter 26, and then output from a terminal 27.

With respect to data which are temporarily stored in the buffer memory 13 and then read out, it is judged on the basis of its data content by the system decoder 22 whether the data are audio data or video data, thereby judging whether the read out data should be supplied to the encoder/decoder 14 or the encoder/decoder 21. The data write operation into the buffer memory 13 and the data read-out operation from the buffer memory 13 are carried out on a sector basis as described later.

Address data output from the address decoder 10 and sub code data supplied for the control operation are supplied to the system controller 11 through the encoder/decoder 8, and used for various kinds of control operations.

Further, a lock detection signal of a PLL circuit for generating a bit clock for recording/reproducing operations, a monitor signal for monitoring a defective state of a frame synchronizing signal of reproduced data, etc. are supplied to the system controller 11.

The system controller 11 outputs a laser control signal $S_{1P}$ for controlling an operation of the laser diode of the optical head 3. The system controller 11 controls an on/off operation of the output of the laser diode, and at its on-operation time, it switches the two kinds of outputs of the laser diode (a relatively low-level power output for the reproducing operation and a relatively high-level power output for the recording operation).

When the recording operation is carried out for the magnetooptical disc 1, the analog audio signals to be recorded are supplied to the terminal 17. Further, the video signals (NTSC composite video signals) are supplied to the terminal 28.

The analog audio signals supplied to the terminal 17 are converted to digital signals by an A/D converter 18, and then supplied to the encoder/decoder 14, in which the digital signals are subjected to an audio compression encode processing. The audio data compressed by the encoder/decoder 14 are temporarily written into the buffer memory 13 by the memory controller 12, then read out at a prescribed timing from the buffer memory 13, and then supplied to the encoder/decoder 8. The compressed audio data are subjected to an encode processing such as CIRC encode, EFM modulation, etc. in the encoder/decoder 8, and then supplied to a magnetic head driving circuit 6.

The NTSC composite video signals which are supplied to the terminal 28 are converted to R, G and B video signals in the comparator 29, and then converted to digital signals by the A/D converter 30. Thereafter, the digital signals thus converted are supplied to the encoder/decoder 21 to be subjected to an encode processing which is conformable to the MPEG system. That is, a DCT (Discrete Cosine Transform) conversion processing, a re-quantization processing, a run-length coding processing, etc.

The video data which are subjected to the compression encode processing by the encoder/decoder 21 are temporarily stored into the buffer memory 13 by the main controller 12, then read out at a prescribed timing from the buffer memory 13, and then supplied to the encoder/decoder 8. The video data are subjected to the encode processing such as the CIRC encode, the EFM modulation, etc., and then supplied to the magnetic head driving circuit 6.

The magnetic head driving circuit 6 is supplied with the audio data and the video data in a time division mode.

In accordance with the supplied recording data, the magnetic head driving circuit 6 supplies a magnetic head driving signal to the magnetic head 6*a*. That is, an N or S perpendicular magnetic field is applied to the magnetooptical disc 1 by the magnetic head 6*a*. At this time, the system controller 11 supplies a control signal to the optical head 3 to output a light beam having recording-level power.

Reference numeral 19 represents an operation input unit provided with keys which are to be manipulated by a user, and reference numeral 20 represents a display unit which comprises a liquid crystal display, for example. The operation input unit 19 is provided with a sound recording key, a reproducing key, a stop key, an AMS key, a search key, etc. which are to be manipulated by the user.

When the recording/reproducing operation is carried out for the disc 1, management data recorded on the disc 1, that is, P-TOC (premastered TOC), U-TOC (user TOC) are read out and supplied to the system controller 11. In accordance with these management data, the system controller 11 identifies the address of a segment on the disc 1 to be recorded, and the address of a segment to be reproduced. These management data are held in the buffer memory 13. Therefore, the buffer memory 13 is divided into a buffer area for recording data/reproducing data and an area for holding the management data.

Further, when a disc 1 is mounted, the system controller 11 moves the optical head 3 to the innermost peripheral side of the disc 1 to read out these management data from the optical head 3, and stores these management data into the buffer memory 13, whereby these management data are allowed to be subsequently referred to in the recording/reproducing operation for the disc 1.

U-TOC is edited and re-written in accordance with a data recording or data deleting operation. The system controller 11 carries out this edition processing for the U-TOC data stored in the buffer memory 13 every time the recording/deleting operation is carried out. In accordance with the re-writing operation, the U-TOC data are read out from the buffer memory 13 to rewrite the U-TOC area on the disc 1 at a predetermined timing.

<2. Construction of disc apparatus usable for only audio data>

Figure 2:
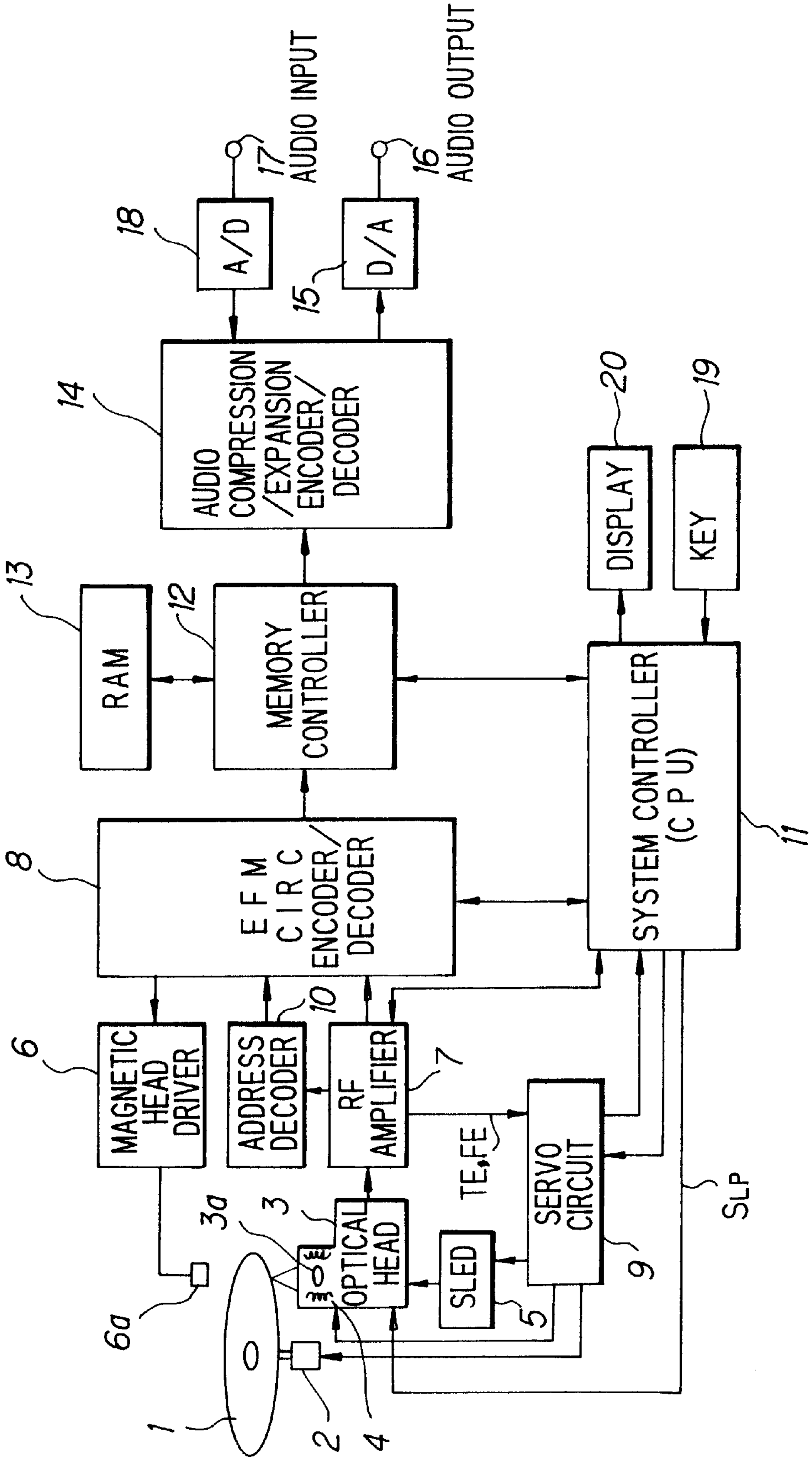
FIG. 2 is a block diagram showing a disc recording and/or reproducing apparatus for processing only audio data of the embodiment according to this invention.

FIG. 2 shows a disc recording and/or reproducing apparatus which can perform the recording and reproducing operation for only audio data. In this case, the construction of the apparatus is similar to the construction of the disc recording and reproducing apparatus shown in FIG. 1 except that the circuit required for addition of video data is removed. That is, the disc recording and/or reproducing apparatus shown in FIG. 2 is not provided with the encoder/decoder 21, the system decoder 22, the video memory 23, the video signal generator 24, the D/A converter 25, the A/D converter 30, the converters 26 and 29, and the terminals 27 and 28. The recording/reproducing operation of the audio data is carried out in the substantially same manner as used for the disc recording and/or reproducing apparatus shown in FIG. 1, and thus the description thereof is omitted.

<3. Track structure of disc>

Figure 3A:
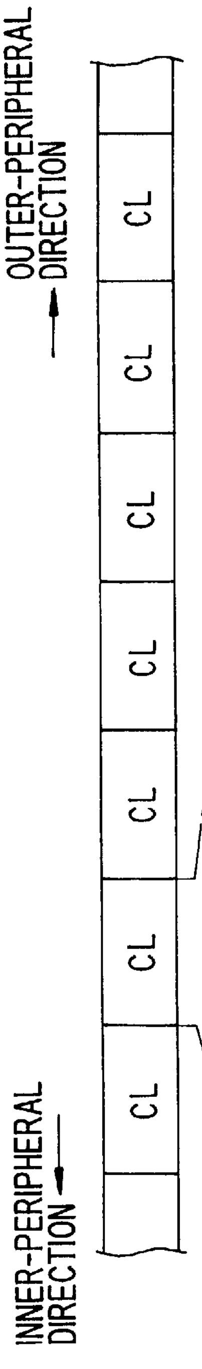
Figure 3B:
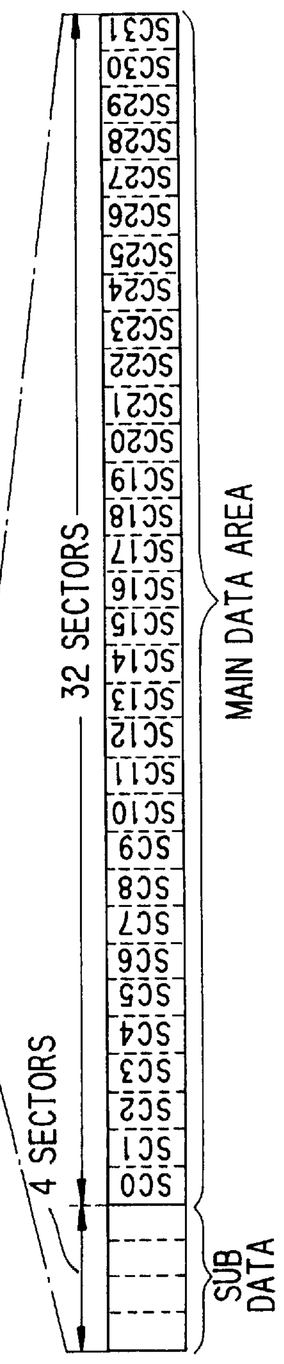

The track structure of the magnetooptical disc 1 is shown in FIGS. 3A to 3D. That is, as shown in FIGS. 3A and 3B, clusters (1 cluster=36 sectors) each of which comprises a sub data area of 4 sectors (1 sector=2352 bytes) and a main data area of 32 sectors (SC0–SC31) are continuously formed on the disc 1, and 1 cluster is set as the minimum unit for the recording and reproducing operation in and from the disc 1. One cluster corresponds to a track length of 2 or 3 revolutions of the disc 1, and an address is recorded for every sector.

The sub data area comprising 4 sectors is used for sub data or as a linking area, and TOC data, audio data, video data, etc. are recorded in the main data area of 32 sectors.

An area for audio data to be recorded in a sector is further divided into sound groups, and 2 sectors are divided into 11 sound groups. The sector structure for video data which is used in this embodiment will be described later.

Figure 3C:
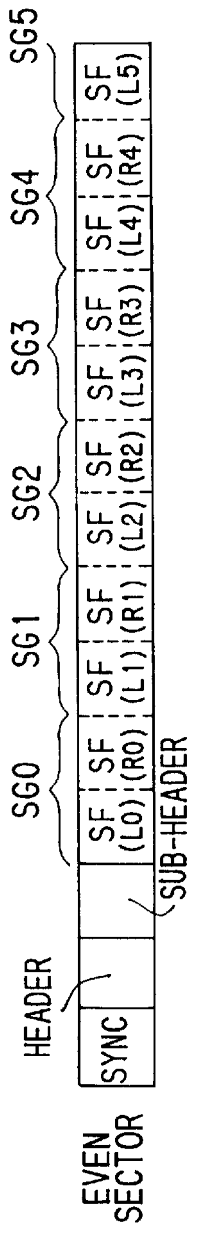
Figure 3D:
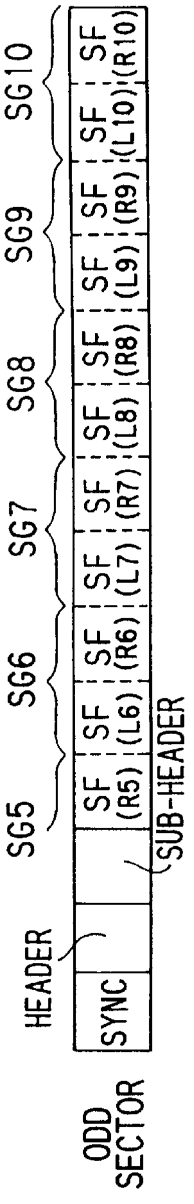

When a cluster having sectors shown in FIG. 3B is used to record audio data, each even sector (SC0, SC2, SC4, . . . ) in FIG. 3B is designed shown in FIG. 3C and each odd sector (SC1, SC3, SC5, . . . ) is designed as shown in FIG. 3D.

As shown in FIGS. 3C and 3D, a synchronizing pattern (SYNC), a header in which an address is recorded, and subsequently a sub header are provided to each sector. Subsequently to the sub header, actual audio data are recorded.

For the audio data to be recorded, a sound frame SF of 212 bytes is used as the minimum data unit, and 11 sound frames are contained in each sector. One sound frame includes data obtained by compressing audio signals corresponding to 11.6 msec for L or R channel.

In each even sector, sound frames for L and R channels are alternately recorded to make an arrangement of a sound frame $SF_{(10)}$ of L channel, a sound frame $SF_{(R0)}$ of R channel, a sound frame $SF_{(11)}$ of L channel, . . . , a sound frame $SF_{(15)}$ of L channel.

On the other hand, in each odd sector, sound frames for L and R channels are alternately recorded to make an arrangement of a sound frame $SF_{(R5)}$ of R channel, a sound frame $SF_{(16)}$ of L channel, a sound frame $SF_{(R6)}$ of R channel, . . . , a sound frame $SF_{(R10)}$ of R channel.

A pair of L and R sound frames constitute one sound group (SG0 to SG10). Accordingly, the sound groups SG0 to SG4 and the first half of the sound group SG5 are recorded in the even sector, and the last half of the sound group SG5 and the sound groups SG6 to SG10 are recorded in the odd sector. That is, as described above, data of 11 sound groups are recorded in two sectors.

<4. P-TOC sector>

Here, a P-TOC sector for management data to manage the recording/reproducing operation of audio data and video data in the disc 1 will be described.

The P-TOC data are used for area indication of a recordable area on the disc, management of an U-TOC area, etc. When the disc 1 is a read-only type optical disc (which is used exclusively for reproduction), management for musical pieces which are recorded in an unrewritable form can be performed by the P-TOC.

FIG. 4 shows the format of P-TOC. FIG. 4 shows one sector (sector 0) for P-TOC data which are repetitively recorded in an area for P-TOC, for example, a ROM area at the innermost peripheral side of the disc. P-TOC for sector 1 and other sectors subsequent to the sector 0 is optionally selected. The P-TOC sector is recorded in a so-called pit form.

The data area of the P-TOC sector (4 bytes×588=2352 bytes) is provided with a synchronizing pattern comprising 1 byte data of all "0" or all "1" at the head position thereof, and subsequently provided with a header of 4 bytes of addresses, which indicates a cluster address and a sector address.

Further, subsequently to the header, an identification ID corresponding to a character "MINI" is added in ASCII format at a predetermined address position. Further subsequently are recorded information on a disc type and a sound recording level, a music number of a recorded first musical piece (First TNO), a music number of a recorded last musical piece )Last TNO), a use status of sectors (Used sectors), a read-out start address $RO_A$, an start address $PC_A$ for an area in which the output level of the light beam is set, a start address $UST_A$ of U-TOC (a data area of U-TOC sector 0 as described later with reference to FIG. 5), a start address $RST_A$ for a recordable area, etc.

Subsequently, a corresponding table indication data portion having table pointers (P-TNO1 to P-TNO255) with which recorded respective musical pieces, etc. are made correspondent to part tables in a managing table portion as described later are provided.

A managing table portion which is provided with 255 part tables from (01h) to (FFh) in correspondence with the table pointers (P-TNO1 to P-TNO255) is provided in an area subsequent to the corresponding table indication data portion. In this specification, a numeral value affixed with "h" is represented by sexadecimal notation. Each of the part tables is designed so that a start address serving as a start point for a segment, an end address serving as an end point for the segment and mode information (track mode) of the segment (track) can be recorded.

The mode information of the track in each part table contains information as to whether over-write inhibition or copy inhibition is set for the segment, information as to whether it is audio information, information on the type of monaural/stereo, etc.

With respect to the part tables (01h) to (FFh) in the managing table portion, the segment content of each of the part tables is shown by each of the table pointers (P-TNO1 to P=TNO255) of the corresponding table indication data portion. That is, for the first musical piece, a part table, for example (01h) is recorded on the basis of the table pointer P-TNO1. However, actually, a numeric value which can indicate a part table serving as a byte position in the P-TOC sector is recorded in the table pointer through a predetermined calculation processing. In this case, the start address of the part table (01h) is the start address for a recording position of the first musical piece, and the end address of the part table is the end address for the recording position of the first musical piece. Further, the track mode information is information on the first musical piece.

Likewise, with respect to a second musical piece, the start address and the end address for the recording position of the second musical piece and the track mode information of the second musical piece are recorded in the part table indicated by P-TNO2, for example, (02h). Subsequently, the table pointers are provided till P-TNO255, and thus musical pieces from first to 255-th can be managed on the P-TOC.

The P-TOC sector 0 is recorded on a read-only type optical disc in the manner as described above, whereby a prescribed musical piece can be accessed and reproduced in a reproducing operation for the read-only type optical disc.

A recordable/reproducible magnetooptical disc has no area in which musical pieces are recorded in a pit form. Accordingly, the corresponding table indication data portion and the managing table portion as described above are not used, and thus each byte is wholly set to "00h". These bytes are managed by U-TOC as described later.

However, for a hybrid type of disc having both of a ROM area and a magnetooptical area as an area in which musical pieces are recorded, the corresponding table indication data portion and the managing table portion as described above are used to manage musical pieces in the ROM area. The term "ROM area" used in the above description means a recording area in which data are unrewritable, and the term "magnetooptical area" means a recording area in which data are recordable.

<5. U-TOC sector>

Next, the U-TOC will be described.

FIG. 5 shows the format of a first sector (U-TOC sector 0) of U-TOC, and this sector is a data area for storing management information on a non-recorded area (hereinafter referred to as a free area) in which musical pieces recorded by a user or new musical pieces can be recorded. In the U-TOC sector, the sector 1 and other sectors subsequent to the sector 0 are optional. In this embodiment, in order to perform the operation of a disc recording and/or reproducing apparatus which is capable of recording/reproducing not only audio data, but also video data, a sector, for example, U-TOC sector 6 having the same format as the U-TOC sector 0 is provided.

The U-TOC sector 0 is the management information for only audio data, and it is used as management information for the recording/reproducing operation of the disc recording and/or reproducing apparatus shown in FIG. 2, and the recording/reproducing operation of only audio data in the disc recording and/or reproducing apparatus shown in FIG. 1. The U-TOC sector 6 is used as management information to simultaneously record/reproduce both of audio data and video data in the disc recording and/or reproducing apparatus shown in FIG. 1.

In the apparatus shown in FIG. 1 or FIG. 2, when a musical piece is recorded on the disc 1, the system controller 11 searches a free area on the disc on the basis of the U-TOC, and records audio data in the free area. At the reproduction time, the system controller 11 identifies from the U-TOC an area in which a musical piece to be reproduced is recorded, and accesses the area to perform the reproducing operation.

Like the P-TOC, the U-TOC sector (sector 0) shown in FIG. 5 is first provided with a synchronizing pattern and a header, and subsequently provided with data on a maker code, a model code, the music number of the first musical piece (First TNO), the music number of the last musical piece (Last TNO), an use status of sectors (Used sectors), a disc serial number, a disc ID, etc.

The first to eight bits of the sector use status (Used sectors) of 1 byte (8 bits), that is, MSB to LSB correspond to U-TOC sector 7 to U-TOC sector 0. When not only audio data, but also video data are recorded on the disc 1 and the U-TOC sector 6 is used as described above, the bit (second bit) of the sector use status (Used sectors) in the U-TOC sector 0 which corresponds to the U-TOC sector 6 is set to "1", and with this setting the disc is identified as a disc having an intermixture of video data and audio data by the system controller 11, for example.

Further, an area in which various kinds of table pointers (P-DFA, P-EMPTY, P-FRA, P-TNO1 to P-TNO255) are recorded is provided as a corresponding table indication data portion in the U-TOC sector 0 in order to make an identification by corresponding an area in which musical pieces are recorded by an user, a non-recorded area, etc. to managing table portions as described later.

255 part tables from (01h) to (FFh) are provided as the managing table portions which will correspond to the table pointers (P-DFA to P-TNO255) of the corresponding table indication data portion. Like the P-TOC sector 0 shown in FIG. 4, in each part table are recorded a start address serving as a start point for a segment, an end address serving as an end point for the segment, and mode information (track mode) of the segment. For the U-TOC sector 0, in some cases a segment indicated by each part table is subsequently linked to another segment, and thus link information for indicating a part table in which the start address and the end address of the segment to be linked are recorded is recorded.

In this type of recording and/or reproducing apparatus, even when data of a musical piece are physically discontinuously recorded, that is, over plural segments ("segment" means a track portion on which physically continuous data are recorded), no obstruction occurs in the reproducing operation by reproducing the data while making an access between segments. Therefore, with respect to a musical piece to be recorded by an user, in some cases it is divisionally recorded over plural segments for the purpose of effective use of a recordable area. Further, when video data and audio data are intermixed with each other, these data are time-divisionally multiplexed with each other, and thus data of a musical piece, for example, are allocated to plural segments.

Therefore, link information is provided, and a part table to be linked is indicated by a number (01h) to (FFh) provided to each part table, actually by a numerical value which is determined as a byte position in the U-TOC sector through the predetermined calculation processing, thereby performing linkage of part tables. With respect to musical pieces, etc. which are beforehand recorded on a read-only type optical disc for audio data, no segment division is usually made to these musical pieces, and thus all the link information are set to "(00h)" in the P-TOC sector 0 as shown in FIG. 4.

That is, in the managing table part of the U-TOC sector 0, one part table represents one segment, and with respect to a musical piece which is constructed by linking three segments, for example, the segment position of the musical piece is managed by three part tables.

The segment content of each of the part tables from (01h) to (FFh) in the managing table portions of the U-TOC sector 0 is indicated by the table pointers (P-DFA, P-EMPTY, P-FRA, P-TNO1 to P-TNO255) as follows.

The table pointer P-DFA represents defective areas on the magnetooptical disc 1, and indicates a part table or the head part table of plural part tables for which a track portion (=segment) identified as a defective area is indicated. That is, when any defective segment exists, any one of (01h) to (FFh) is recorded in the table pointer P-DFA, and the defective segment is indicated with the start and end addresses in the corresponding part table. When another defective segment exists, another part table is indicated as link information in the part table, and the other defective segment is indicated in the part table. When no other defective segments exist, the link information is set to “(00h)” for example, thereby representing that no other segments to be linked exist.

The table pointer P-EMPTY represents the head part table of one or plural unused part tables in the managing table portion, and when any unused part table exists, any one of (01h)f to (FFh) is recorded as the table pointer P-EMPTY. When plural unused part tables exist, the part tables are successively indicated by link information from a part table which is indicated by the table pointer P-EMPTY, and all the unused part tables are linked on the managing table portion.

The table pointer P-FRA represents a data-writable free area on the disc 1. The “free area” in this case contains an area in which data have been already recorded and the data may be deleted. The table pointer P-FRA represents the head part table in one or plural part tables in which a track portion (=segment) serving as a free area is indicated. When any free area exists, any one of (01h) to (FFh) is recorded in the table pointer P-FRA, and the segment serving as the free area is represented with the start and end addresses in the corresponding part tables. When there exist a plurality of these segments, that is, there exist a plurality of part tables, these part tables are successively indicated by the link information until the indication reaches a part table whose link information is set to “(00h)”.

Figure 6:
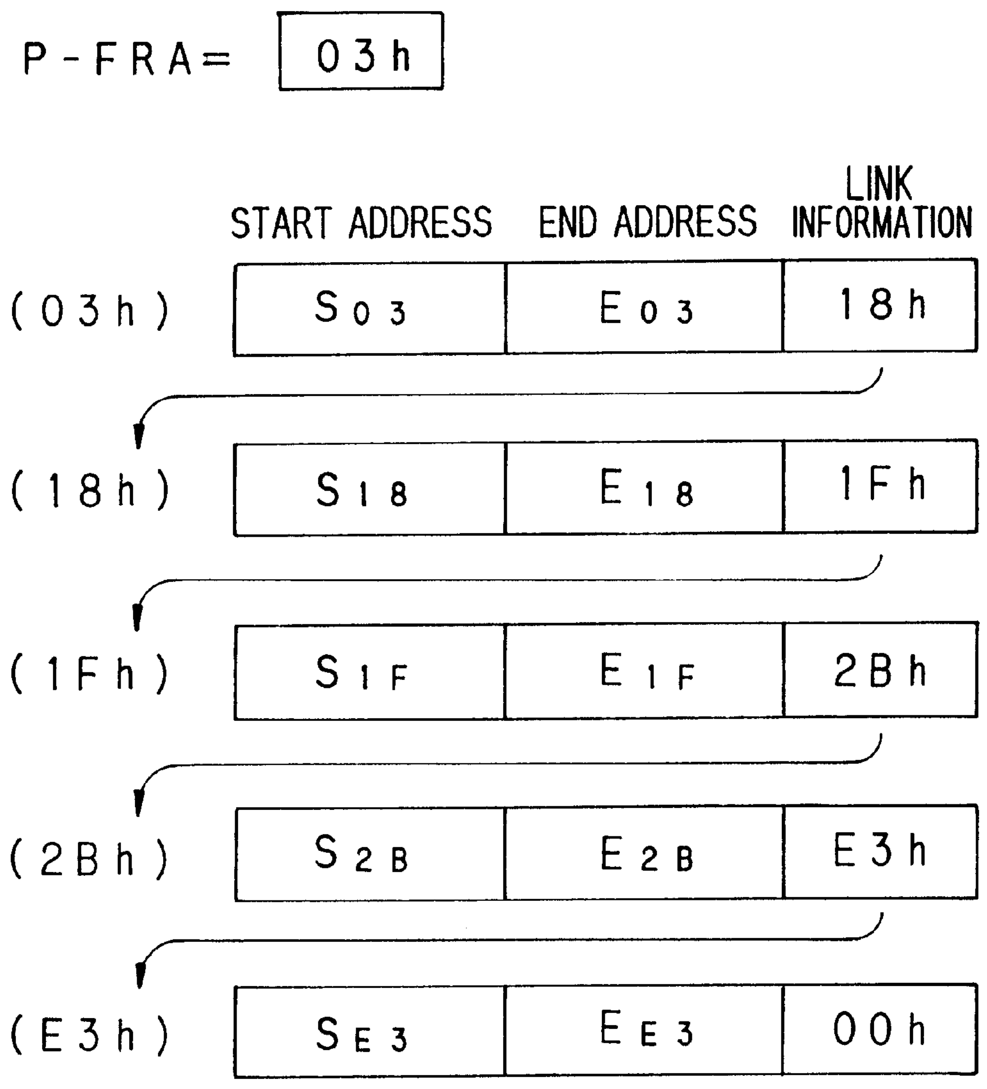
FIG. 6 is a schematic diagram showing a management state of a segment by a part table of U-TOC information.

FIG. 6 is a schematic diagram showing a management state of segments serving as free areas. In this diagram, segments (03h)(18h)(1Fh)(2Bh)(E3h) are free areas, and this sequence of the free areas is represented by the corresponding table indication data P-FRA and the subsequent link of part tables (03h)(18h)(1Fh)(2Bh)(E3h). The same management manner is also used for the defective areas and the unused part tables as described above.

If no audio data such as musical pieces are recorded and no defect exists on a magnetooptical disc, the part table (01h) is indicated by the table pointer P-FRA, whereby the whole recording area on the disc is indicated as a non-recorded area, that is, a free area. In this case, the other part tables of (02h) to (FFh) are not used. Therefore, the part table (02h) is indicated by the table pointer P-EMPTY, the part table (02h) is indicated by the link information of the part table (02h), and the part table (04h) is indicated by the link information of the part table (03h). This linking indication is performed till the part table (FFh). In this case, the link information of the part table (FFh) is set to “(00h)” indicating no subsequent linkage.

In this case, for the part table (01h), a start address of a recordable user area is recorded as a start address, and an address just before a lead-out start address is recorded as an end address.

The table pointers P-TNO1 to P-TNO255 represent musical pieces which are recorded on the magnetooptical disc by a user, and for example the table pointer P-TNO1 indicates a part table indicating the head segment on a time axis of one or plural segments in which a first musical piece is recorded.

For example, when the first musical piece is recorded without dividing the track into sections on the disc, that is, is recorded in one segment, the recording area for the musical piece is recorded with the start and end addresses of a part table which is indicated by the table pointer P-TNO1.

Further, for example when a second musical piece is discretely recorded in plural segments on the disc, the respective segments are indicated in a time order to indicate the recording position of the musical piece. That is, as shown in FIG. 6, other part tables are successively indicated in a time order by the link information from a part table which is indicated by the table pointer P-TNO2, and the linkage is continued till a part table whose link information is set to “(00h)”. As described above, the data constituting the second musical piece are recorded over plural segments while the plural segments are successively indicated by the link information. Therefore, when the second musical piece is reproduced or an overwriting is conducted on the area for the second musical piece, it can be realized using the data of the U-TOC sector 0 that the optical head 3 and the magnetic head 6 is accessed to the disc to take out continuous music information from the discrete segments and perform a recording operation with effective use of a recording area.

As described above, the area management on the disc is performed by the P-TOC, and audio data such as musical pieces recorded in the recordable user area, the fee area in which audio data are recordable, etc. are managed by the U-TOC.

This TOC information are written into the buffer memory 13 so that the system controller 11 can refer to this information.

In this embodiment, for a disc on which video data and audio data are recorded in an intermixing state, it is unsuitable in the U-TOC sector that segments in which the video data are recorded are managed as a recordable area or reproduction area. Therefore, in the U-TOC sector 0, the segments in which the video data are recorded are treated as invalid areas, for example, defect areas which are linked from the table pointer P-DFA for management, or non-existent areas, that is, areas which are not linked from any one of P-TNO1 to P-TNO255. That is, no recording/reproducing operation of the segments in which the video data are recorded can be performed by the U-TOC sector 0.

The concrete management system for the recording/reproducing operation of the audio data and the video data will be described later, and this management is realized in the U-TOC sector 6. In this embodiment, the structure of the U-TOC sector 6 is identical to that of the U-TOC sector 0 shown in FIG. 5.

<6. Audio data sector structure of disc>

Figure 7:
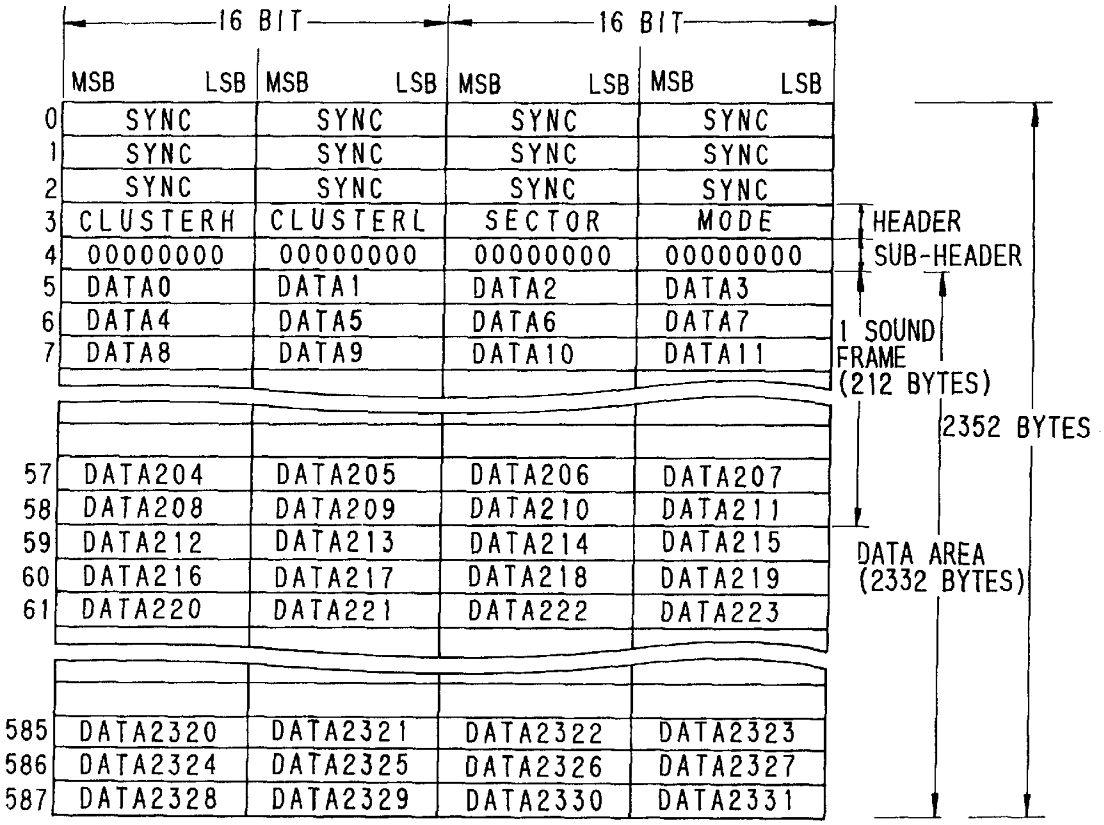
FIG. 7 shows a format of a sector on which audio data are recorded.

The format of the sector in which audio data are recorded is set as shown in FIG. 7.

In the sector (2352 bytes), 12 bytes at the head position are allocated to the synchronizing data. Subsequently to these bytes, 3 bytes are set for a cluster address and a sector address, and 1 byte subsequent thereto is allocated to a mode, these bytes constituting a header.

Subsequently to the header, 4 bytes are set for a subheader, and 2332 bytes from 21st byte to 2352 byte of the sector which are subsequent to the subheader are set for a data area (Data0 to Data2331).

The data area of 2332 bytes is stored with 11 units of sound frames each comprising 212 bytes as shown in FIG. 3. Accordingly, 5.5 units of sound groups are recorded in one sector, and 11 units of sound groups are recorded in two sectors, an even sector whose sector address is even (LSB of the address is equal to 0), and a next sector, that is, an odd sector whose sector address is odd (LSB of the address is equal to 1).

<7. Video data sector structure of disc>

The format of a sector for video data which are recorded while intermixed with audio data on a time axis is set as shown in FIG. 8.

In this sector (2352 bytes), 12 bytes at the head position are allocated to the synchronizing data, a subsequent 3 bytes are set for the cluster address and the sector address and subsequent 1 byte is allocated to a mode, these bytes constituting a header.

Subsequently to the header, 8 bytes are set for a subheader, and bytes subsequent to the subheader, that is, 2324 bytes from a 25-th byte to a 2348-th byte of the sector are set for an area (PACK-Data0 to PACK-Data2323) of video data (1 pack of video data). Video signals of 1 frame which are subjected to a compression coding in accordance with MPEG system are recorded as video data of 1 pack in the data area of 2324 bytes. The last 4 bytes of the sector are reserved.

Figure 9:
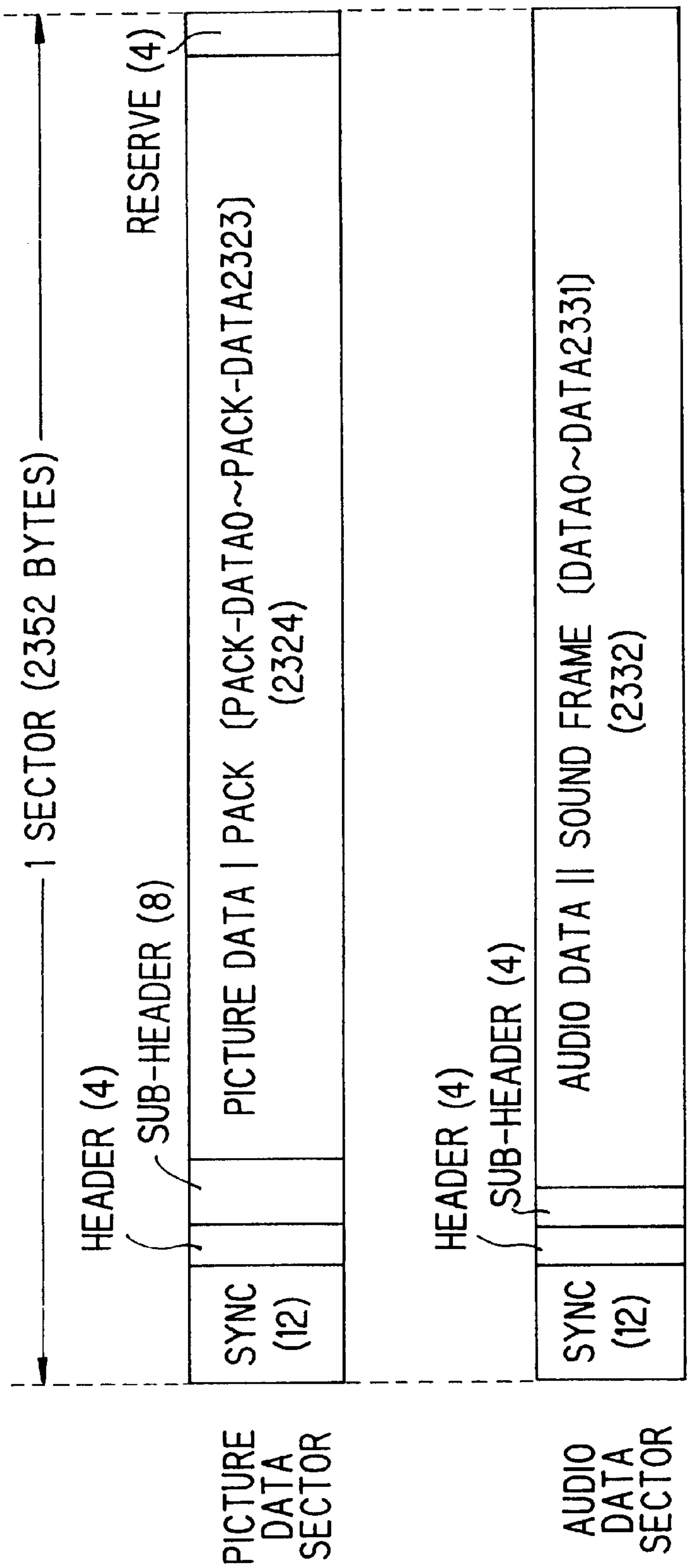
FIG. 9 is a diagram showing a sector on which each of audio data and video data is recorded.

FIG. 9 is a simplified diagram of the video data sector of FIG. 8 and the audio data sector of FIG. 7 for comparison.

<8. Video data generating system>

Here, the video data which are subjected to the compression coding in accordance with the MPEG system.

In this embodiment, the video signal before being compressed is set in NTSC system, and in the NTSC system one second corresponds to video signals of 30 frames.

In the MPEG system, the video signal of one frame is divided into blocks in the plan direction (22 blocks in a lateral direction and 15 blocks in a longitudinal direction, totally 330 blocks). Data of each block are subjected to a DCT conversion, and then to re-quantization to reduce the bit number, whereby a high-frequency band component is set to zero. The order of blocks is rearranged to be zigzagged from the block at the upper left side of one frame, and then a runlength coding is conducted to further reduce the bit number.

With respect to each frame of video signals which are subjected to the compression coding as described above, frames which are located after and before each other on a time axis are very similar to each other as video information, and using this the information is further compressed, so that three kinds of video data (video data of 1 frame) having different compression degrees are provided. These are called as "I picture (Intra Picture)", "P picture (Predicated Picture)" and "B picture (Bidirectionari Picture)".

Figure 10A:
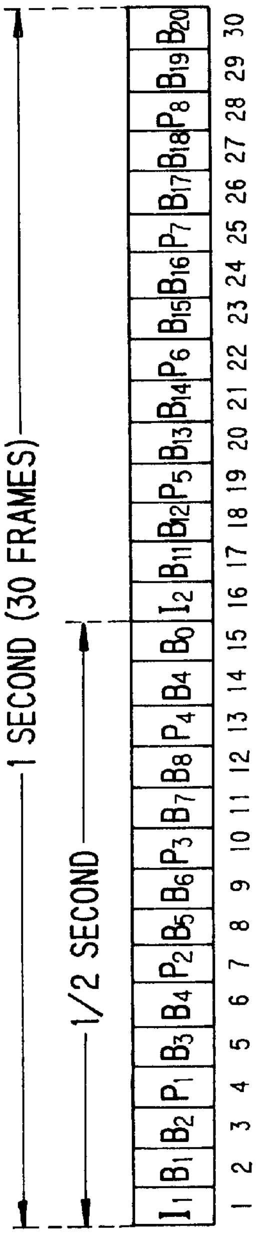
Figure 10B:
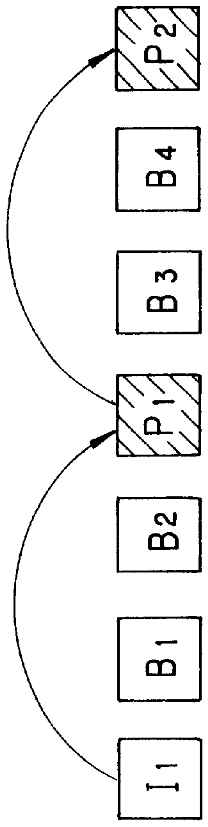

For the 30 frames of 1 second, I pictures, P pictures and B pictures are generally arranged as shown in FIG. 10A. In this case, frames at an interval of 1/2 second are set to I pictures $I_1$ and $I_2$. Eight P pictures of $P_1$ to $P_8$ and twenty B pictures of $B_1$ to $B_{20}$ are arranged as shown in the figure.

The I picture is normal image data which are coded by the DCT conversion as described above.

The P picture is generated by coding the nearest I picture or P picture sing a motion compensation. For example, the P pictures $P_1$ and $P_2$ are generated with the I picture $I_1$ and the P picture $P_1$, respectively.

Therefore, the P picture is more compressed than the I picture. The P picture is generated using the I picture or P picture before the order rearrangement. Therefore, when an error occurs, the error is transferred.

Figure 10C:
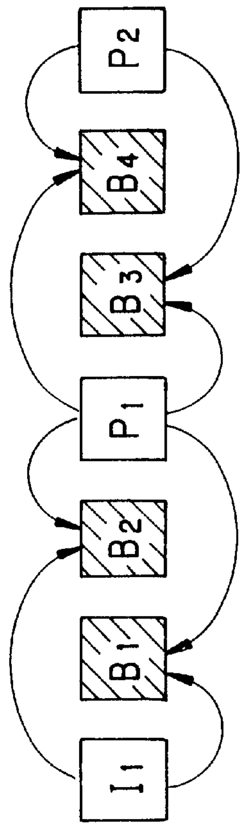

The B picture is generated using both of past and future I pictures or P pictures as shown in FIG. 10C.

For example, the B pictures $B_1$ and $B_2$ are generated using the I picture $I_1$ and the P picture $P_1$, and the B pictures $B_3$ and $B_4$ are generated using the P pictures $P_1$ and the P picture $P_2$.

The B picture is the most compressed data. Further, it is not used as a data generation reference, and thus no error is transferred to this picture.

For the MPEG algorithm, the position and synchronization of I pictures are allowed to be selected, and this selection is determined on the basis of matters such as a random access degree, a scene cut, etc. For example, if the random access is weighted, at least two I pictures are required for one second as shown in FIG. 10A. Further, the frequency of the P pictures and the B pictures is also selectable, and this is set in accordance with a memory capacity of an encode means.

The encode means of the MPEG system is designed to rearrange and output a video data stream to improve an efficiency in a decoder.

Figures 11A, 11B:
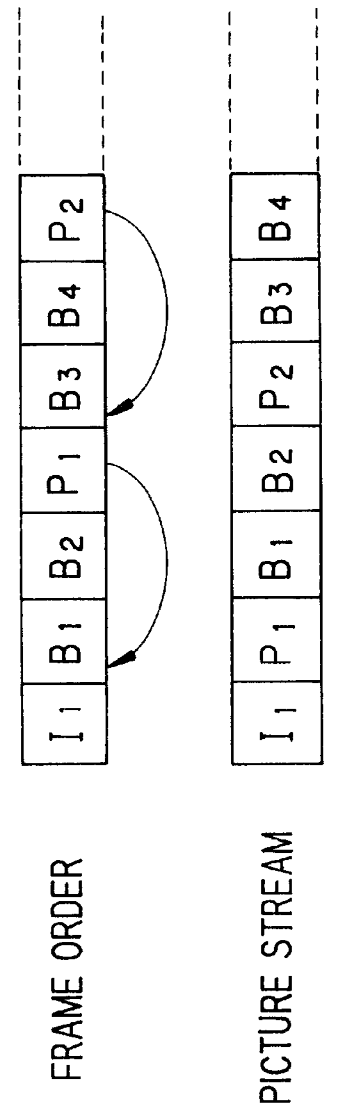

For example, in the case of FIG. 10A, a frame order to be displayed (output order of decoder) is matched with a frame number shown at the lower portion of FIG. 10A. In this case, the decoder recomposes a B picture, and thus a P picture which serves as a reference before the B picture is required. Therefore, the frame order shown in FIG. 11A is rearranged to that shown in FIG. 11B, and the rearranged data are transferred as a video data stream.

<9. Track structure having intermixture of audio data and video data>

Figure 12:
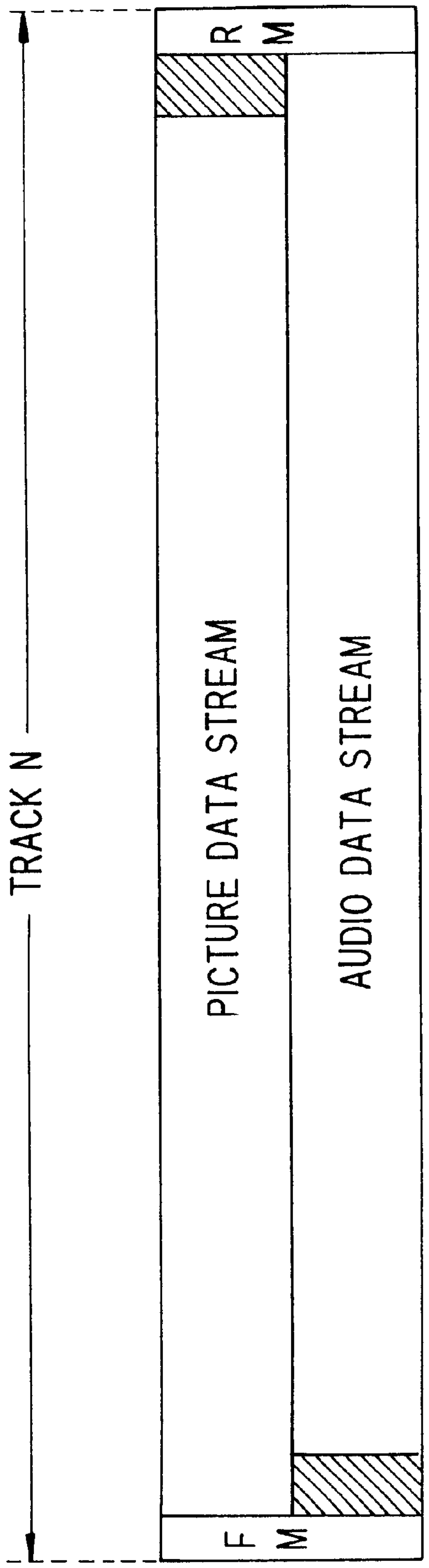
FIG. 12 shows a track on which audio data and video data are intermixed with each other.

In this embodiment, the video data which are compressed in accordance with the MPEG system are recordable/reproducible together with audio data. For example, when audio data for a musical piece and video data of pictures which are matched with the musical piece are considered, a data structure for a musical piece (track N) is shown in FIG. 12. FM represents a front margin, and RM represents a rear margin. Empty data areas of 15 sectors or more are allocated to each of FM and RM.

Figure 13:
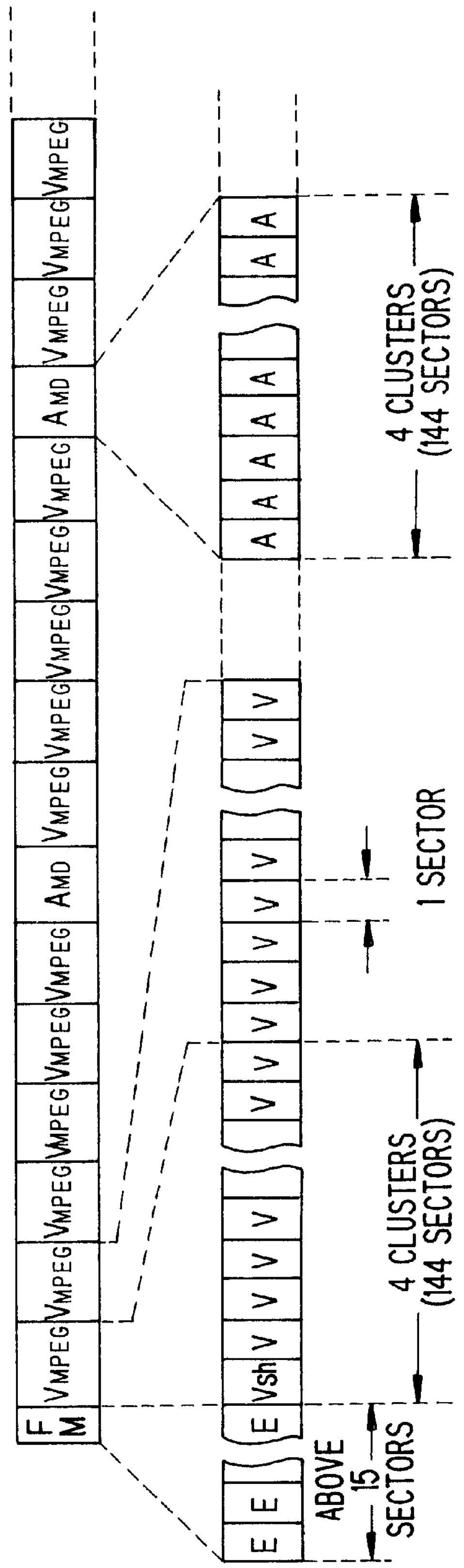
FIG. 13 shows the data structure of a track on which audio data and video data are intermixed with each other.

The video data as a video data stream and the audio data as an audio data stream are time-divisionally multiplexed with each other with n:1 interleave and recorded on a disc as shown in FIG. 13.

Here, $V_{MPEG}$ represents a data unit for video data, and $A_{MP}$ represents a data unit for audio data. Each of these data unit has at least 4-cluster length, and the interleave is performed using this unit as the minimum unit.

FIG. 13 shows the details of the head portion of the track N of FIG. 12. The front margin FM comprises empty sectors E of 15 sectors or more.

Each of the video data unit $V_{MPEG}$ comprises 4 clusters (144 sectors), and the head sector of the video data unit $V_{MPEG}$ which serves as the top of a musical piece is set to a video data sector $V_{sh}$ added with a system header, and subsequently ordinary video data sectors V are sequential to the video data sector. The video data sector $V_{sh}$ and V have the same format as shown in FIG. 8.

If each audio data unit $A_{MD}$ is set to 4 clusters (144 sectors) for example, 144 audio data sectors shown in FIG. 7 would be allocated to each audio data unit $A_{MD}$.

<10. Video data format>

The use manner of pack data of 2324 bytes (PACK-Data0 to PACK-Data2323 in FIG. 8) in the video data sectors $V_{sh}$ and V will be hereunder described.

Figures 14A, 14E:
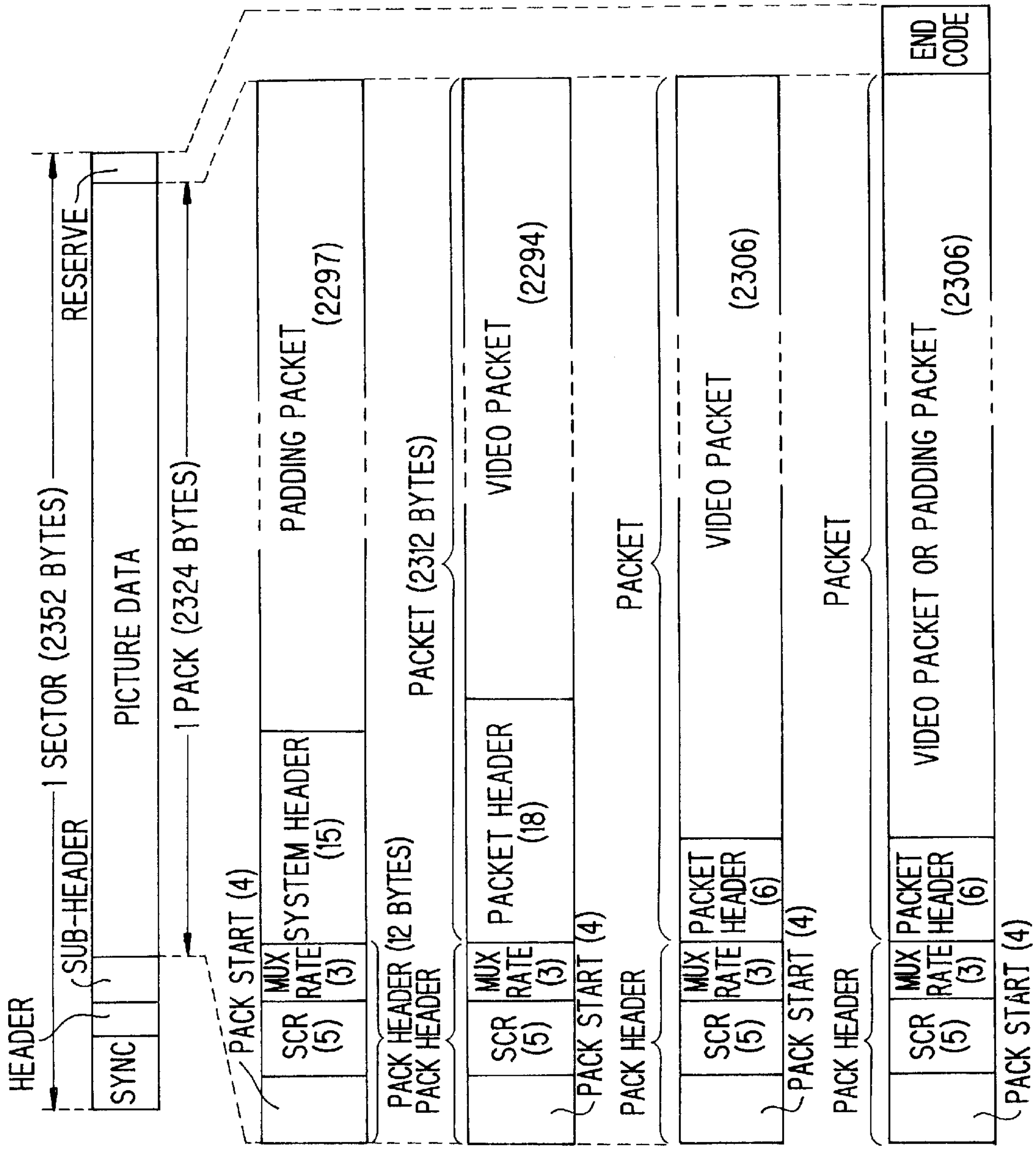

FIG. 14A shows the structure of the video data sector shown in FIG. 9 again, and the structure of one pack of the video data is shown in FIGS. 14B to 14E. FIG. 14B shows pack data on the video data sector $V_{sh}$ which is the head sector of a musical piece.

A pack header of 12 bytes (PACK-Data0 to PACK-Data11) is provided at the head as the pack data in the sector. The pack header is provided with a pack start code of 4 bytes, subsequently with a system clock reference (SCR) of 5 bytes, and finally with an MUX rate of 3 bytes.

The system clock reference (SCR) is a code representing a kind of absolute time, and a PTS (Presentation Time Stamp: Image output start time) is determined using this SCR as a reference.

SCR is calculated on the basis of the following equation: SCR(i)=C+i*1200. i represents an index number of a sector in a video data stream, and it is set to "0" at a front margin FM portion located at the head. C represents a constant, and it is set to "0" at all times. The value "1200" is a value (90000/75=1200) at a system clock time of 90 KHz in a 75 Hz sector. The pack header is provided to all the sectors ($V_{ssi\ h}$, V) in the video data.

In the video data sector $V_{ssi\ h}$, a system header of 15 bytes (PACK-Data2 to PACK-Data26) are provided subsequently to the pack header. 2297 bytes (PACK-Data27 to PACK-Data2323) which are subsequent to the system header are set as a padding packet which is ordinarily filled with FFh.

Figure 15:
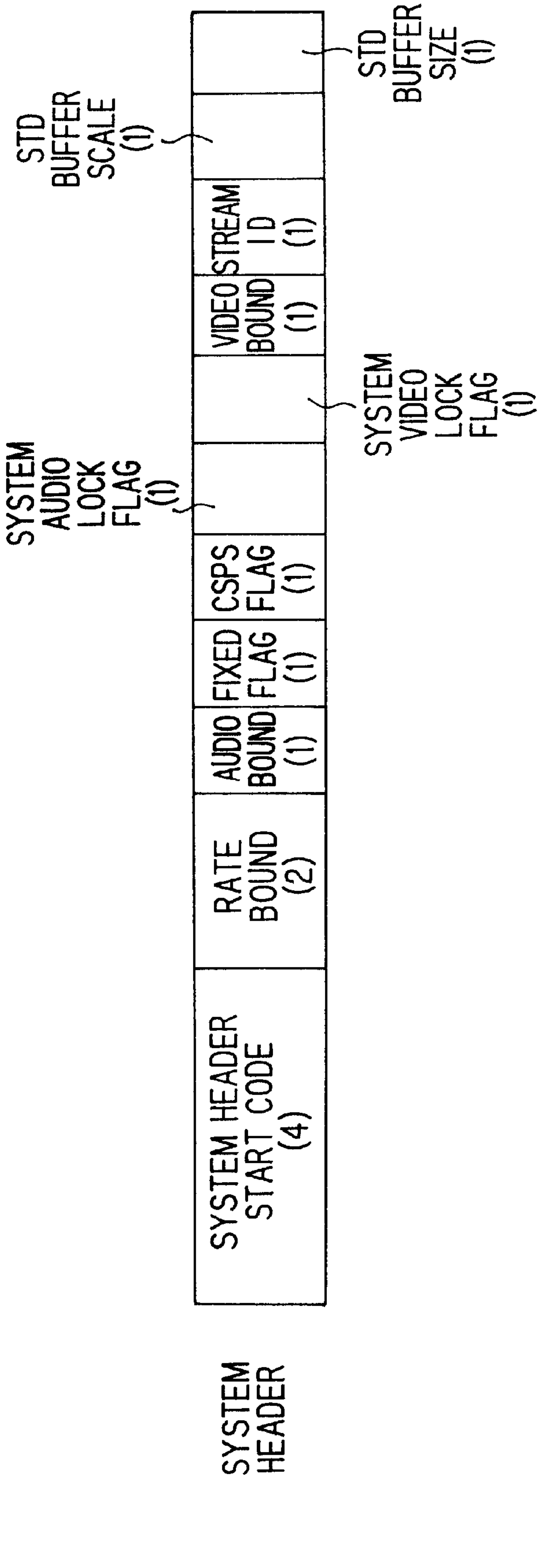
FIG. 15 shows the data structure of a system header of the sector $V_{sh}$.

The system header of 15 bytes is designed as shown in FIG. 15.

First, a system header start code of 4 bytes is provided, and subsequently a rate bound of 2 bytes is provided. Subsequently, an audio bound, a fixed flag, a video bound, a stream ID, an STD buffer bound scale and an STD buffer size bound, each of which comprises 1 byte, are provided.

The video data sector V subsequent to the video data sector $V_{sh}$ is designed as shown in FIGS. 14C, 14D and 14E.

At least a video data sector V next to the video data sector $V_{sh}$ is designed as shown in FIG. 14C. That is, a packet header of 18 bytes (PACK-Data12 to PACK-Data29) is provided subsequently to the pack header. 2294 bytes (PACK-Data30 to PACK-Data2323) subsequent to the packet header is set as a video packet, and actual video data are recorded in this area.

Figure 16A:
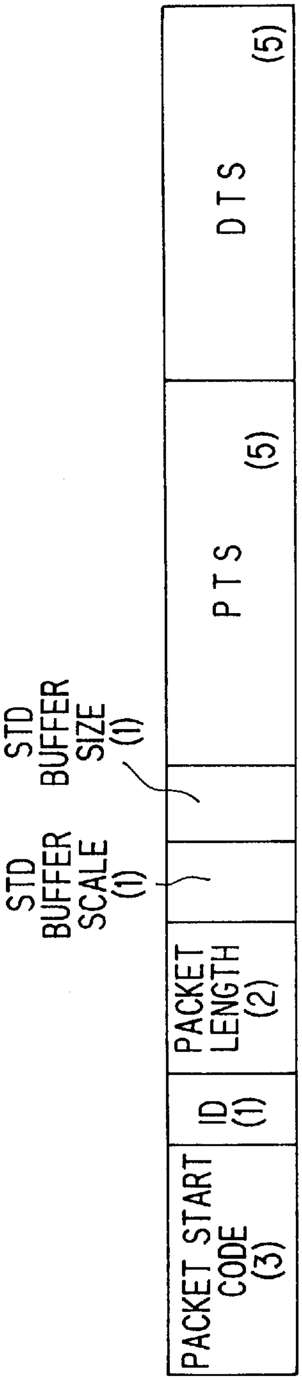

The packet header is designed as shown in FIG. 16A, and 3 bytes at the head position are allocated to a packet start code. Subsequently, an ID of 1 byte, a packet length of 2 bytes, a STD buffer scale of 1 byte, a STD buffer size of 1 byte, a PTS of 5 bytes, and a DTS (decoding time stamp) of 5 bytes are recorded in the packet header. The PTS serving as the image output start time is set so that it is synchronized with the audio data. The DTS represents a decode start time.

Figure 16B:
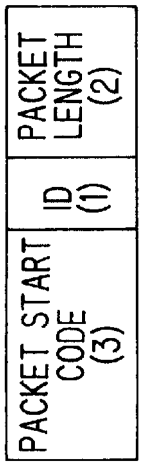

As described above, in the first video data sector V, the video packet is set to 2294 bytes at maximum as shown in FIG. 14C. In the sectors V subsequent to the first video data sector, the STD buffer scale, the STD buffer size, the PTS and the DTS in the packet header are omitted, and the packet header may be set to 6 bytes as shown in FIG. 16B. In this case, the construction of one pack is shown in FIG. 14D, and the video packet is expanded to 2306 bytes.

Further, in the last video data sector V in a musical piece (track N), an encode of 4 bytes is recorded at the end of the sector.

<11. Recording/reproduction managing system>

In this embodiment, the video data thus constructed are recorded/reproduced on the disc 1 together with the audio data. The management system for the recording and reproducing operation for these data will be hereunder described.

Figure 17:
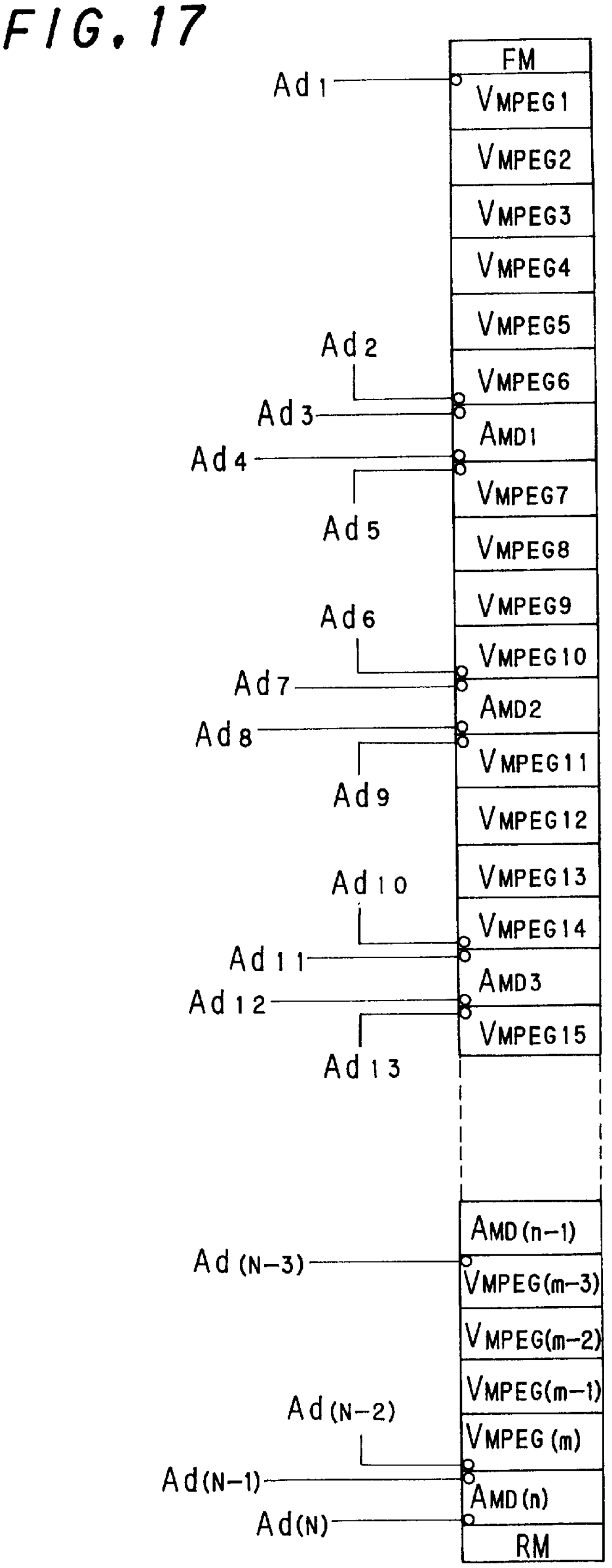
FIG. 17 shows the track structure.

Now, it is assumed that audio data for a musical piece (for example, track 1) and video data matched with the musical piece are recorded as shown in FIG. 17. That is, the audio data for a musical piece are divided into segments $A_{MD1}$ to $A_{MD(n)}$, and recorded while interleaved with the audio data $V_{MPEG}$. Each of the segments $A_{MD1}$ to $A_{MD(n)}$ is set to have an audio data amount corresponding to about 8 seconds, for example. Further, video data ($V_{MPEG}$) of 4 to 6 units which is located between the respective audio data segments are set to have a video data amount corresponding to about 8 seconds. Here, $Ad_1$ to $AD_{(N)}$ represent addresses on the disc 1.

As described above, in the U-TOC sector 0, only the audio data segments of these data are managed.

However, when the video data are intermixed with the audio data, in order to indicate that the simultaneous recording/reproduction of video data and audio data is managed by the U-TOC sector 6, the second bit serving as information on the U-TOC sector 6 in the sector use status (used sectors) of the U-TOC sector 0 is set to "1".

Figure 18:
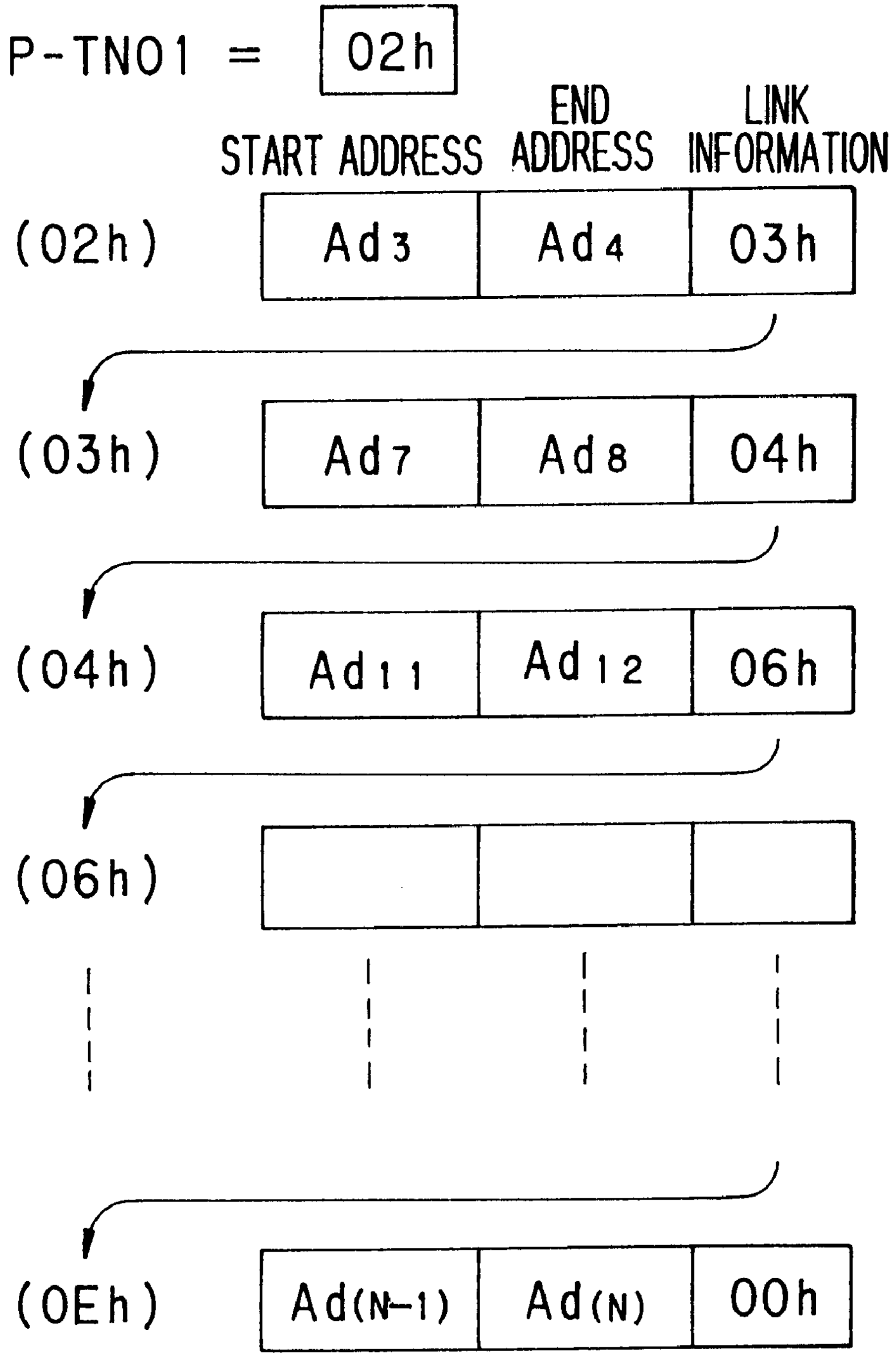
FIG. 18 is a schematic diagram showing a management system for audio data by U-TOC sector 0.

Since the first musical piece is managed in the U-TOC sector 0, the link structure as shown in FIG. 18 is formed subsequently to the table pointer P-TNO1 in the U-TOC sector 0.

For example, when the table pointer P-TNO1 represents the part table "02h", the part table (02h) is used to manage the audio data segment $A_{MD1}$. That is, the start address and the end address are recorded as $Ad_3$ and $Ad_4$ respectively, and the part table (03h) is recorded as link information. The linked part table (03h) is used to manage the audio data segment $A_{MD2}$. That is, the start address and the end address are recorded as $Ad_7$ and $Ad_8$, and the part table (04h) is recorded as link information.

The linked part table (04h) is used to manage the audio data segment $A_{MD3}$, and the start address and the end address are recorded as $Ad_{11}$ and $Ad_{12}$ respectively in the part table (04h). Subsequently, link information of a part table for managing the audio data segment ($A_{MD4}$) is recorded in the part table (04h).

The above link format is constructed till a part table for an audio data segment $A_{MD(n)}$, for example, a part table (0Eh), and the start address and the end address are recorded as $Ad_{(N-1)}$ and $Ad_{(N)}$ respectively in the part table (0Eh). The link information is set to "00h" indicating no subsequent linkage.

Figure 19:
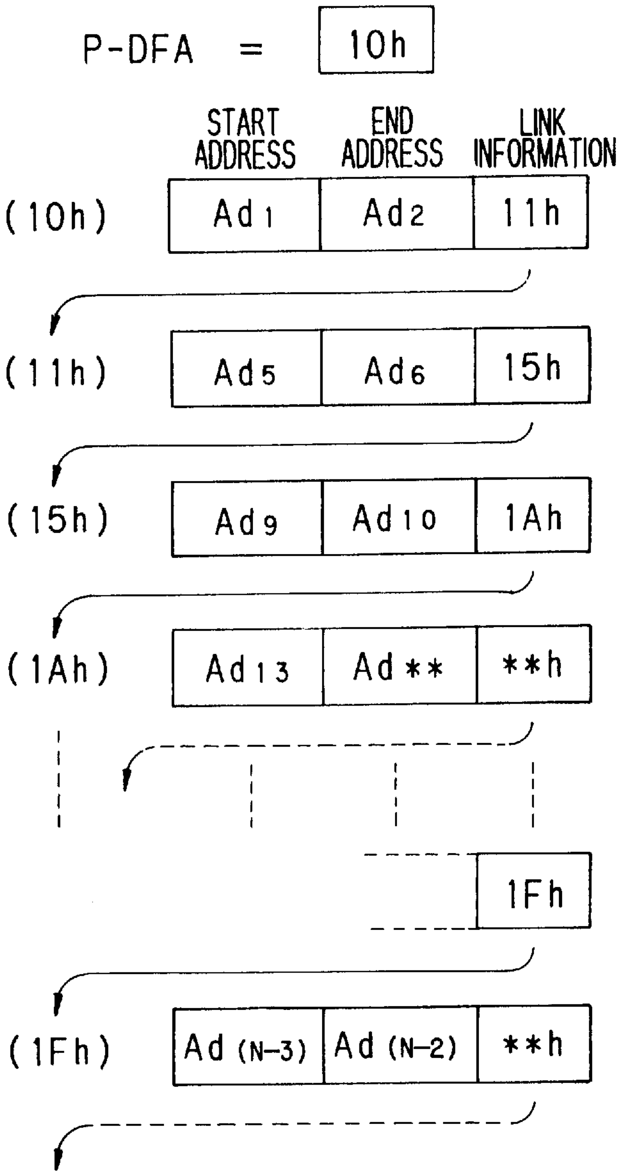
FIG. 19 is a schematic diagram showing a management system for video data by U-TOC sector 0.

In the U-TOC sector 0, a portion in which video data are recorded must be set so that it is not a musical piece and not a newly-recordable free area. The portion in which the video data are recorded is regarded as a defect area, and managed by the link structure extending from the table pointer P-DFA as shown in FIG. 19.

For example, if the table pointer P-DFA represents a part table "10h", the part table (10h) is represented as indicating that the video data segments ($V_{MPEG1}$ to $V_{MPEG6}$) are defect areas, that is, the start address and the end address are recorded as $Ad_1$ and $Ad_2$. As link information is recorded a part table (11h), for example.

The linked part table (11h) is used for management in which the video data segments ($V_{MPEG7}$ to $V_{MPEG10}$) are regarded as defect areas. That is, the start address and the end address are recorded as $Ad_5$ and $Ad_6$ in the part table (11h), and for example a part table (15h) is recorded as link information.

The linked part table (15h) is used for management in which the video data segments ($V_{MPEG11}$ to $V_{MPEG14}$) are regarded as defect areas. The start address and the end address are recorded as $Ad_9$ and $Ad_{10}$ respectively in the part table (15h), and subsequently link information of a part table for managing the video data segments ($V_{MPEG10}$ . . . ) as defect areas is recorded.

Within the musical piece shown in FIG. 17, the link format as described above is constructed till a part table for video data segments ($V_{MPEG(n-3)}$ to $V_{MPEG(n)}$), for example a part table (1Fh). The start address and the end address are recorded as $Ad_{(N-3)}$ and $Ad_{(N-2)}$ in the part table (1Fh). Here, link information to a part table for managing a next video data segment is recorded so that video data segments for another musical piece are regarded as defect areas. If only one musical piece is recorded and no defect area exists, the link information of the part table is set to "00h" representing no linkage.

In the U-TOC sector 0, the audio data segments are managed as musical pieces as described above. On the other hand, the video data segments are regarded as defect areas, and managed as unrecordable/unreproducible areas.

On the other hand, in the U-TOC sector 6 which is designed in the same construction as the U-TOC sector 0, the segment management is performed so that video and audio outputs are simultaneously carried out. In this case, no division of segments is carried out between the video data portion $V_{MPEG}$ and the audio data portion $A_{MD}$, and for example portions from $V_{MPEG1}$ to $A_{MD(n)}$ are regarded as one segment. In a case where this track is halfway divided and recorded at physically-separated positions, these portions are regarded as two or more segments, and managed by two or more part tables.

Figure 20:
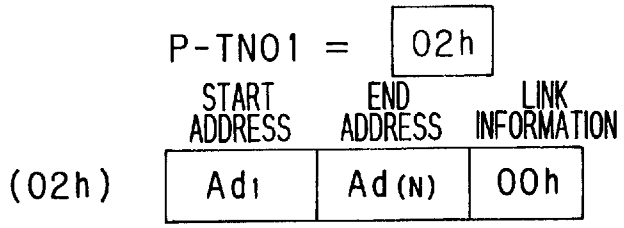
FIG. 20 is a schematic diagram showing a management system for a track having intermixture of video data and audio data by U-TOC sector.

For management of data of a first musical piece in the U-TOC sector 6, this segment is represented as shown in FIG. 20 subsequently to the table pointer P-TNO1.

For example when the table pointer P-TNO1 indicates a part table "02h", in the part table (02h) the start address and the end address are recorded as $Ad_1$ and $Ad_{(N)}$ respectively. If this track (first musical piece) is physically continuous recorded, the link information is recorded as "00h".

In the U-TOC sector 6, an area in which no data (video data or audio data) are actually recorded is managed as a free area from the table pointer P-FRA.

As described above, the recorded audio and video data are managed by the U-TOC sector 0 and the U-TOC sector 6, whereby this type of disc is compatible between the disc recording and/or reproducing apparatus shown in FIG. 1 and the disc recording and/or reproducing apparatus shown in FIG. 2.

That is, in the disc recording and/or reproducing apparatus shown in FIG. 2 which is a recording and reproducing equipment for only audio data, the reproducing operation is carried out using the U-TOC sector 0 to enable reproduction of only sounds. Further, an area in which video data are recorded is not managed as a free area, that is, no management by the table pointer P-FRA is conducted on this area, and it is regarded as a defect area which is an unrecordable/reproducible area. Therefore, the video data are prevented from being deleted through the recording operation of the audio data.

In the disc recording and/or reproducing apparatus shown in FIG. 1 which are usable for both of video data and audio data, if a sector use status (Used sectors) in the U-TOC sector 0 is checked for a loaded disc and it is confirmed that information (second bit=1) indicating use of the U-TOC sector 6 is recorded in the sector use status, it is judged that video data are also recorded on the disc 1. In this case, by referring to the U-TOC sector 6, the video data ($V_{MPEG}$) and the audio data ($A_{MD}$) can be directly scanned to be reproduced.

At this time, it is judged by the system decoder 22 whether the data read out from the disc are the video data or the audio data as described above. Further, the synchronization control of the decode outputs of the encoder/decoder 14 and the encoder/decoder 21 is performed through the control of the system decoder 22, whereby both of pictures and music can be simultaneously reproduced. Accordingly, the apparatus shown in FIG. 1 can be used as the same type of video equipment as a Karaoke equipment having a picture function, an optical video disc apparatus or a VTR apparatus.

When video data and audio data are recorded, a free area is searched from the table pointer P-FRA in the U-TOC sector 6, and the track (musical pieces or the like) is recorded in the format as shown in FIG. 17.

In the disc recording and/or reproducing apparatus shown in FIG. 1, when the second bit of the sector use status (Used sectors) of the U-TOC sector 0 is equal to "0", the U-TOC sector 6 is judged to be unused. That is, since no video data exists on the loaded disc, the apparatus can record/reproduce the audio data on the loaded disc using the U-TOC sector 0 directly.

Further, even when video data exist on the disc, for example, the recording/reproduction of only audio data using the U-TOC sector 0 can be performed in accordance with the mode selection operation or the like by the user.

In this embodiment, the video data are managed while being regarded as a defect area in the U-TOC sector 0. However, they may be treated as segments which never appears on the managing table.

For example, they are set as segments which are not indicated by any one of part tables linked from each of the table pointers P-FRA, P-DFA, P-TNO1 to P-TNO255, and may be regarded as areas which never exist on the disc in the U-TOC sector 0.

The sector used to manage the simultaneous recording/reproduction of the audio data and the video data is not limited to the U-TOC sector 6, but it may be another sector in the U-TOC.

When such a disc having video data and audio data intermixed with each other thereon is formed as being exclusively used for reproduction as a premaster, the management of only the audio data as performed in the U-TOC sector 0 may be performed in the P-TOC sector 0, and the management as performed by the U-TOC sector 6 is performed by another sector in the U-TOC sector 6.

This invention is applicable to a hybrid type disc having a data read-only area, that is, a data unrewritable area, and a data recordable/reproducible magnetooptical area. In this case, for example, the audio and video data may be managed in the same manner as described above for read-only data by the P-TOC sector 0 and the P-TOC sector 6 and for magnetooptical data by the U-TOC sector 0 and the U-TOC sector 6.

<12. Management system for obtaining reproduction inhibiting portion by only ordinary U-TOC sector>

As described above, The area (segment) which is managed from the table pointer P-DFA in the U-TOC sector is an area in which no recording/reproduction can be performed by an ordinary operation using the U-TOC sector.

By utilizing this effect, it can be performed that audio or video data to be kept secret are managed so that only specific users can reproduce these data. That is, data which cannot be recorded/reproduced without inputting an identification number (hereinafter referred to as "reproduction inhibition instructing data) can be generated.

Two systems will be described for a system for management/reproduction by generating reproduction inhibition instructing data using the table pointer P-DFA and inputting an identification number.

One system is a management system/reproduction system to obtain a reproduction inhibiting portion with only an ordinary U-TOC sector. The ordinary U-TOC sector means a sector such as the sector 0 or sector 6 in the U-TOC as described above.

The other system is a management system/reproduction system when an ID demand U-TOC sector is used, and the ID demand U-TOC sector means sectors other than the sector 0 or sector 6 in the U-TOC.

The two types of systems as described below is applicable to not only an audio/video intermixed disc on which audio and video data are intermixed with each other and which uses the U-TOC sectors 0 and 6, but also a disc on which only audio data are recorded and a disc which is an audio/video intermixed disc, but has no compatibility as described above.

First, the management system to obtain a reproduction inhibiting portion with only an ordinary U-TOC sector will be described.

Figure 21:
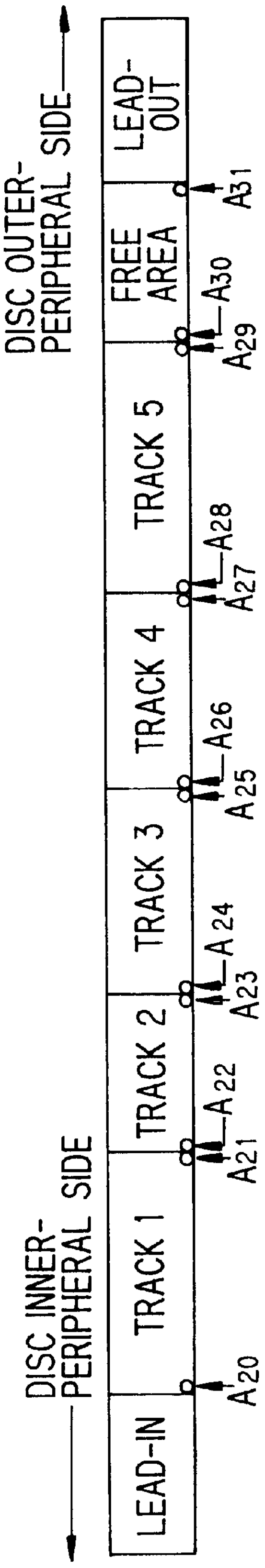
FIG. 21 is a diagram showing a track mode for a management state by reproduction indication inhibiting data.

Now, it is assumed that five tracks of track 1 to track 5 are recorded on the disc 1 as shown in FIG. 21. If this disc is an audio/video data intermixed disc, the tracks 1 to 5 have data recorded thereon as described with reference to FIGS. 12 and 13. These data are managed so that only the audio data are reproduced by the U-TOC sector 0 recorded in the lead-in area and both of the audio and video data are simultaneously reproduced by the U-TOC sector 6 recorded in the lead-in area (hereinafter referred to as "intermixed compatible disc").

If the disc is a disc for only audio data, data are recorded in the format as shown in FIGS. 3C, 3D and 7 in all the sectors of a main data area. In this case, the data management is performed by the U-TOC sector 0, and the U-TOC sector 6 is unused (hereinafter referred to as "audio disc").

Further, a disc which is a audio/video data intermixed disc, but incompatible with the disc recording and/or reproducing apparatus shown in FIG. 2 may be considered although this type of disc is not described in the foregoing description. That is, as described in FIGS. 12 and 13, the data are recorded on the tracks 1 to 5, and these data are managed by the U-TOC sector 0 so that both of audio and video data are simultaneously reproduced while no management is performed on the reproduction of only the audio data (hereinafter referred to as "intermixed incompatible disc).

The following description is made in consideration of the above three kinds of discs, that is, the intermixed compatible disc, the audio disc and the intermixed incompatible disc.

A recording state of FIG. 21 is managed as shown in FIG. 22. The U-TOC sector of FIG. 22 indicates the U-TOC sector 6 for the intermixed compatible disc, and the U-TOC sector 0 for the audio disc or intermixed incompatible disc.

As shown in FIG. 22, in the track 1, the part table (01h) is indicated from the table pointer P-TNO1 to indicate the start address $A_{20}$ and the end address $A_{21}$. Likewise, in the tracks 2 to 5, the start and end addresses are indicated by the part tables (02h) to (05h) which are indicated by the table pointers PF-TNO2 to P-TNO5, respectively.

When an user wants to indicate the track 3 as reproduction inhibition indicating data to keep secrecy or the like, the user operates the used disc recording and/or reproducing apparatus to make a reproduction inhibition registration for the track 3, and input an identification number. The input identification number is stored in an internal RAM or external RAM of the system controller 11 of the disc recording and/or reproducing apparatus shown in FIG. 1 or FIG. 2. This RAM is required to be backed up or to be formed of a non-volatile RAM or the like so that data are not deleted at an off-time of a power source.

When the reproduction inhibition registration of the track 3 for example is carried out as described above, the system controller 11 rewrites TOC data read in the buffer memory 13, and writes the data onto the disc 1.

That is, the U-TOC sector 6 or sector 0 is rewritten as shown in FIG. 23. First, the segment (address $a_{24}$ to $A_{26}$) serving as the track 3 is taken in as a part table (03h) which is indicated from the table pointer P-DFA as a defect area. The tracks 1, 2, 4 and 5 is managed as the first track to the fourth track indicated by the table pointers P-TNO1 to P-TNO4, respectively. Therefore, usually, only four tracks are apparently managed.

For example when the reproduction inhibiting registration is conducted on both of the tracks 3 and 5, the system controller 11 rewrites the U-TOC sector 6 or sector 0 as shown in FIG. 24. That is, the segment (addresses $A_{28}$ to $A_{29}$) serving as the track 3 and the segment (addresses $A_{28}$ to $A_{29}$) serving as the track 5 are taken in as part tables (03h) and (05h) which are indicated from the table pointer P-ODFA as a defect area. The tracks 1, 2 and 4 are managed as the first track to the third track by the part tables (01h)(02h)(04h) which are indicated by the table pointers P-TNO1 to P-TNO3 respectively.

For example when the reproduction inhibiting registration is conducted on all the tracks 1 to 5 using an operation input unit 19, the system controller 11 rewrites the U-TOC sector 6 or sector 0 as shown in FIG. 25. That is, each of the segments serving as the tracks 1 to 5 are collectively treated as one segment (addresses $A_{20}$ to $A_{29}$), and it is taken in as the part table (01h) which is indicated from the table pointer P-DFA as the defect area. No indication of the part table by the table pointer P-TNO* is performed.

FIG. 25 shows a state where the segments are unified into one segment. The respective segments may be linked to each other while divided into the part tables (01h) to (05h), and managed as a defect area.

For example, by managing the segments as shown in FIGS. 23 through 25, an area for which the reproduction inhibiting registration is performed is regarded as a defect area at a normal reproduction time, and thus it is not reproduced.

A specific example is shown in FIGS. 23 through 25, and another state may be taken in the similar reproduction inhibiting registration state. The actual state is varied in accordance with the used part table or the link mode of each track.

In a case where although the track division is carried out, but the reproduction inhibiting registration is conducted, the reproduction inhibiting registration is conducted on a part of a track, the track division editing processing is conducted to set the part as a track, and the reproduction inhibiting registration is conducted to the track. When there are plural data portions on which the reproduction inhibiting registration is required to be conducted, each data portion is subjected to a division edition as one track, and then the respective tracks are subjected to a link edition to be unified into one track, or the system controller automatically makes the link edition in accordance with indication of the plural tracks, the obtained track being taken in a defect area. That is, the format as shown in FIGS. 24 and 25 may be obtained.

Further, for a read-only type optical disc, in the P-TOC sector 6 or 0, a disc manufacturer may manage a prescribed area as a defect area.

<13. Reproduction system when reproduction inhibiting portion is obtained with only ordinary U-TOC sector>

Figure 26:
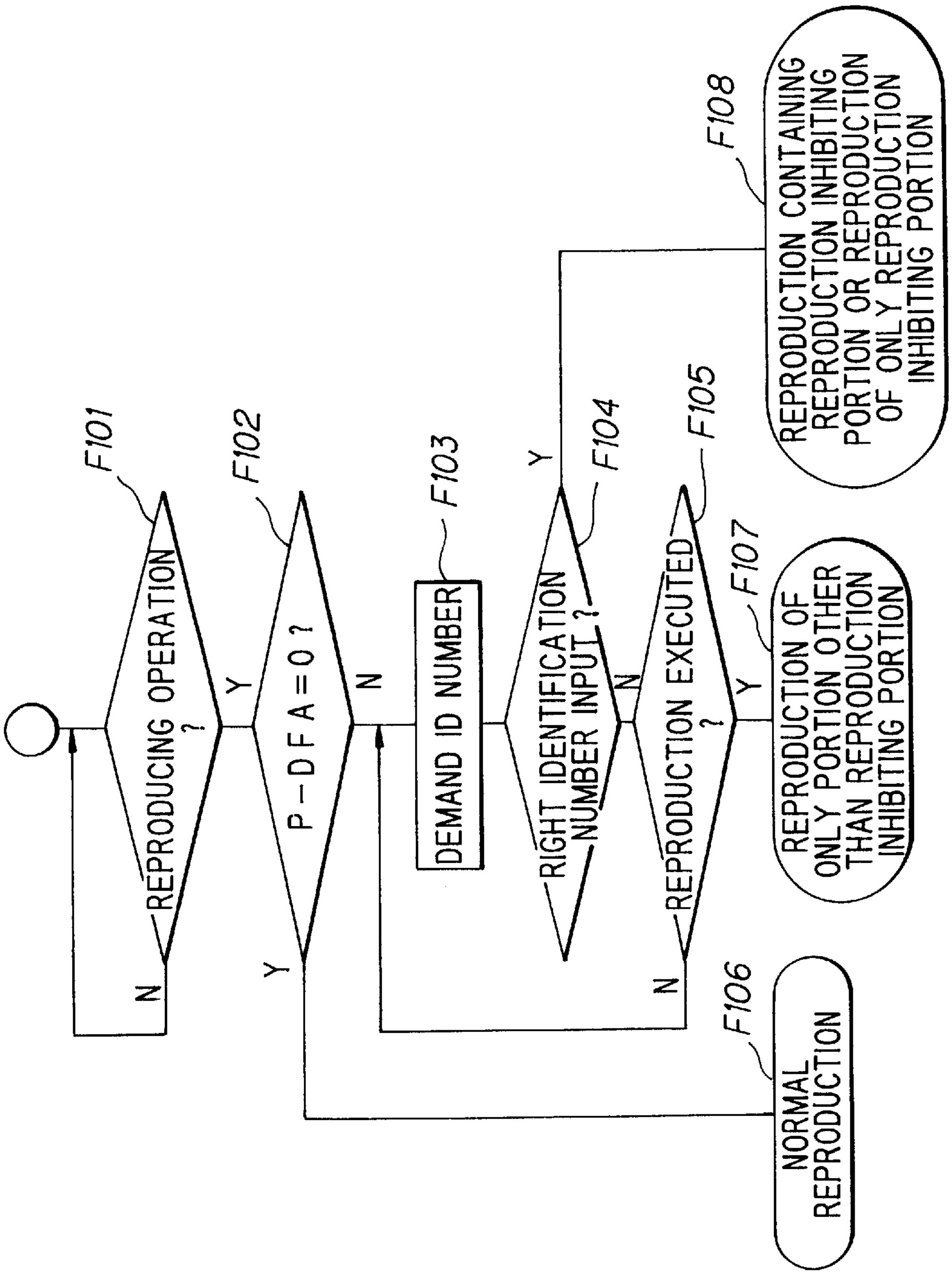
FIG. 26 is a flowchart for a reproduction processing of a disc in which the reproduction inhibiting instruction is set.

For a disc on which the above management may be conducted, the processing as shown in FIG. 26 is conducted at the reproduction time in the disc recording and/or reproducing apparatus shown in FIG. 1 or FIG. 2.

When a manipulation for reproduction is carried out (F101), it is judged whether there exists any defect area, that is, any area for which the reproduction inhibition is indicated (F102). In order to make this judgment, in the disc recording and/or reproducing apparatus shown in FIG. 1, it is first judged on the basis of the sector use status of the U-TOC sector 0 whether the U-TOC sector 6 is used. If the U-TOC sector 6 is judged to be used, that is, if the disc is an intermixed compatible disc, it is judged whether the table pointer P-DFA of the U-TOC sector 6 is equal to "00h" or a part table is indicated.

If the U-TOC sector 6 is judged to be unused, that is, if the disc is an audio disc or intermixed incompatible disc, it is judged whether the table pointer P-DFA of the U-TOC sector 0 is equal to "00h" or a part table is indicated. In the case of the disc recording and/or reproducing apparatus shown in FIG. 2, the judgment is made on the basis of the table pointer P-DFA of the U-TOC sector 0.

If the table pointer P-DFA is equal to "00h", no reproduction-inhibition indicated data exists, and thus the program goes to a step F106 to start an ordinary reproducing operation.

If the table pointer P-DFA is not equal to "00h", then reproduction-inhibition indicated data exists. Accordingly, input of an identification number is first demanded at a step F103. For example, a display for promoting the input of the identification number is made in a display unit 20.

At this time, when an user cannot input a correct identification number, that is, cannot input an identification number which is registered to the disc recording and/or reproducing apparatus, for example, when a reproduction execution manipulation is carried out again or when a predetermined time elapses with no input operation, the program goes from the step F105 to the step F107 to carry out the ordinary reproducing operation. The same reproducing operation control as the step F106 is carried out. That is, only data which are managed from the table pointer P-TNO* are reproduced, and a portion which is regarded as a defect area on the management is not reproduced. Accordingly, only data for which no reproduction inhibiting registration is made are reproduced.

On the other hand, when the user inputs a correct identification number, the program goes from the step F104 to a step F108 to carry out the reproduction of the reproduction inhibiting data too. For example, subsequently to the reproduction of the data which are managed from the table pointer P-TNO*, data which are managed from the table pointer P-DFA are also reproduced. Alternately, in this case, only the data which are managed from the table pointer P-DFA may be reproduced.

That is, in the operation of the step F108, for the intermixed compatible disc, the data which are managed from the table pointer P-DFA in the U-TOC sector 6 are reproduced. For the audio data or intermixed incompatible disc, the data which are managed from the table pointer P-DFA are reproduced.

Through the above processing, the user can keep desired data secret with an identification number.

In a case where the intermixed compatible disc on which the video data portion is managed as a defect area in the U-TOC sector 0 is used and only the audio data are reproduced in the disc recording and/or reproducing apparatus shown in FIG. 2, it is also considered that only the audio data of the data portion for which the reproduction inhibiting indication is made in the U-TOC sector 6 are reproduced because the U-TOC sector 0 is used.

In order to prevent this, it is also considered that when the reproduction inhibiting indication is made, in the U-TOC sector 0 the segments of the audio data of the reproduction-inhibition indicated data portion are edited as a defect area together with the video data. Alternately, in the U-TOC sector 0 the segments of the audio data for which the reproduction inhibition is indicated are treated as an area which has no link from any table pointer and thus is never managed. That is, when the reproduction inhibition is indicated, the audio data are set not to be reproducible by the disc recording and/or reproducing apparatus shown in FIG. 2, and set to be reproducible simultaneously with the video data only when an identification number is input.

In the system as described above, no reproduction is conducted on the reproduction-inhibition indicated data without input of an identification number in only a disc for which the identification number is registered. However, when another user registers an identification number in another disc recording and/or reproducing apparatus, the data can be reproduced with the identification number.

Accordingly, this system is suitably used for a case where the reproduction-inhibition indication is executed on data having relatively low secrecy, and it is suitably used as means of inhibiting children from seeing and hearing at home data on a disc on which video data and audio data for adult are recorded, for example.

In order to keep relatively high secrecy, it is considered that data for identifying a disc as well as an identification number is kept in the disc recording and/or reproducing apparatus. For example, for a disc in which a part or whole data are indicated as reproduction-inhibition indicated data, data inherent to the disc, that is, identification data are generated with a part of TOC data, and registered in a non-volatile RAM or the like. As shown in the U-TOC sector shown in FIG. 5, an data area as a disc ID exists in the U-TOC. By using this data area, an ID is allocated to each disc with a random number or continuous numerical number of 2 bytes, and thus this number may be registered in the non-volatile RAM or the like.

As described above, the disc recording and/or reproducing apparatus keeps the identification information on the disc having the reproduction-inhibition indicated data, whereby the reproduction-inhibition indicated data are reproduced using only the disc recording and/or reproducing apparatus and only when the identification number is input.

That is, in the case where any reproduction-inhibition indicated data exists on a loaded disc for reproduction, in the processing of the step F104 shown in FIG. 26, the program goes to the step F108 only when it is judged that a correct identification number is input and the loaded disc is a disc for which a disc ID or identification number is registered.

When a higher secrecy is required, a system in which an input identification number is written on the disc is considered. That is, the identification number is written in using an unused byte of the U-TOC sector 0 or sector 6.

At the disc recording and/or reproducing apparatus side, no identification number is kept (in this case, it is not required for the disc recording and/or reproducing apparatus to keep the identification numbers). In this case, when an identification number is written in the U-TOC sector 0 or sector 6, at the reproduction time, the user is promoted to input an identification number to make a coincidence judgment between the input identification number and the identification number written on the U-TOC. If the coincidence is judged, the data which are managed from the table pointer P-DFA can be reproduced.

With this system, no reproduction-inhibition indicated data can be reproduced even using any disc recording and/or reproducing apparatus unless the written identification number is unknown.

When an identification number is written in the U-TOC, this system is preferably designed so that others cannot rewrite the identification number. For example, the following processing may be adopted: input of an identification number is demanded even when the identification number is rewritten, and the identification number is rewritten to a newly input identification number if the coincidence is judged.

<14. Management system when ID demand U-TOC sector is used>

In the system as described above, the reproduction-inhibition indicated data are managed while regarded as one track which is linked from the table pointer P-DFA, and there occurs a case where the reproducing operation in the original track order cannot be performed even when a correct identification number is input.

For example, when the track 3 of FIG. 21 is indicated as reproduction inhibition, the status as the third track is lost at the time when the reproduction inhibition is indicated. Further, when the reproduction inhibition is indicated for plural tracks such as tracks 3 and 5, the reproduction in the order before indication cannot be performed because these tracks are linked and unified into one track.

Accordingly, in the above system, no critical problem occurs when each track is allocated to each musical piece or the like. However, in a case where all the data recorded on the disc constitutes a movie, if the reproduction inhibition is indicated for a part of the data, no original reproduction can be performed even when a correct identification is input. For example, only a data portion of the track 3 is reproduced at the last time, and thus the reproduction is carried out in a incorrect time order.

Accordingly, in order to enable individual reproduction-inhibition indication of plural data portions and perform the reproduction in an original state, that is, in a state before the reproduction-inhibition indication at the ID number input and reproduction time, the management system/reproduction system using the ID demand U-TOC sector will be described.

In this system, the U-TOC to be used is varied between cases where an identification number is input at the reproducing time and where no identification number is input at the reproducing time, and in addition to the ordinary U-TOC sectors such as the U-TOC sector 0 and the U-TOC sector 6, an ID demand U-TOC sector is used. The following description is made when the U-TOC sector 5 is used as the ID demand U-TOC sector.

For example when an operation of setting a track as reproduction-inhibition indicated data is performed in a data state as shown in FIG. 21, like the case shown in FIGS. 23 through 25, the rewriting in the U-TOC sector 6 and sector 0 is managed through linkage from the table pointer P-DFA while unifying one or plural segments serving as reproduction-inhibition indicated data. However, before the U-TOC sector 6 or sector 0 is edited, the table pointer and part tables in the U-TOC sector 6 or sector 0 in a state before the reproduction-inhibition is indicated, that is, the data shown in FIG. 22 are written into the U-TOC sector 5, and the U-TOC sector 5 is set as the ID demand U-TOC sector.

In accordance with the writing of the data into the U-TOC sector 5 at the operation time of the reproduction-inhibition indication as described above, a bit (third bit) corresponding to the sector 5 is set to "1" as information of the sector use status in the U-TOC sector 0.

As described above, the reproduction-inhibition indicated data portions are collectively regarded as a defect area as shown in FIGS. 22 to 24 in the U-TOC sector 6 or 0, so that when the reproduction is carried out using the U-TOC sector 6 or 0, the reproduction-inhibition indicated data are not reproduced.

On the other hand, in the U-TOC sector 5, the reproduction-inhibition indicated data and the ordinary data are managed in the state before the reproduction-inhibition is indicated, and thus by carrying out the reproduction using the U-TOC sector 5, the reproduction can be performed in an original reproduction order. Further, each of the reproduction-inhibition indicated data is managed as one track, and they are not linked to one another. Therefore, when plural tracks are indicated as reproduction-inhibition indicated data, they are managed without being directly unified.

When all the reproduction-inhibition indicated data are released, the information of the U-TOC sector 0 is written into the U-TOC sector 6 or 0. In order to make the U-TOC sector 5 unused, the bit (third bit) corresponding to the sector 5 is rewritten to "0" as the information of the sector use status in the U-TOC sector 0, whereby the disc can be returned to the state before the reproduction-inhibition is indicated.

<15. Reproduction system when the ID demand U-TOC sector is used>

Figure 28:
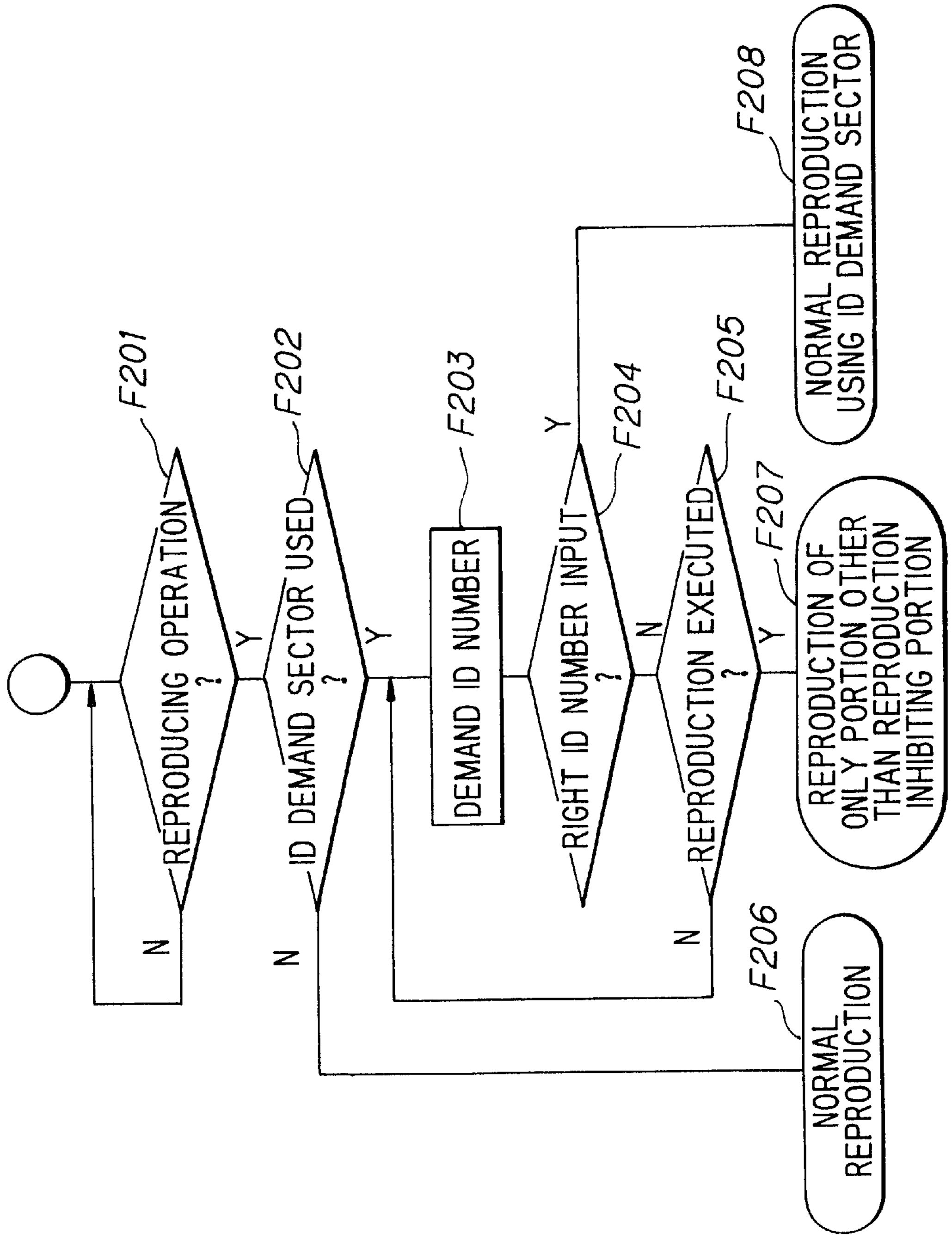
FIG. 28 is a flowchart for the reproduction processing of a disc for which an ID number demand is set.

For the disc which may be managed in accordance with the system as described above, the disc recording and/or reproducing apparatus shown in FIG. 1 or FIG. 2 carries out the processing as shown in FIG. 28 at the reproducing time.

When an operation for reproduction is carried out (F201), it is first judged whether a reproduction-inhibition indicated area exists on the disc (F202). This judgement is performed in the disc recording and/or reproducing apparatus shown in FIG. 1 or FIG. 2 by judging on the basis of the sector use status of the U-TOC sector 0 whether the U-TOC sector 5 is used. In any one of the intermixed compatible disc, the audio disc and the intermixed incompatible disc, if the U-TOC sector 5 is not used in this disc, it is judged that a reproduction-inhibition indicated area exists in the disc.

Here, if the U-TOC sector 5 is unused, no reproduction-inhibition indicated data exists, and thus the program goes to a step F206 to start the ordinary reproducing operation.

If any reproduction-inhibition indicated data exists, input of an identification number is demanded at a step F203. For example, a display for promoting the input of the identification number is made on the display unit 20.

Here, when the user cannot input a correct identification number, that is, an identification number which is registered in the disc recording and/or reproducing apparatus, for example when the operation for executing the reproduction is carried out again with no input or when a predetermined time elapses in a state with no input, the program goes from the step F205 to a step F207 to carry out an ordinary reproducing operation. The reproducing operation control is identical to that of a step F206. That is, when the intermixed compatible disc is reproduced by the disc recording and/or reproducing apparatus shown in FIG. 1, the U-TOC sector 6 is used. When the intermixed compatible disc is reproduced by the disc recording and/or reproducing apparatus shown in FIG. 2, the U-TOC sector 0 is used to perform the reproduction. Further, for the audio disc or the intermixed incompatible disc, the U-TOC sector 0 is used.

In this case, only the reproduction of data which are managed from the table pointer P-TNO, no reproduction is carried out on the defect area. Accordingly, only the data for which the reproduction-inhibition registration is not carried out are reproduced.

On the other hand, when the user inputs a correct identification number, the program goes from the step F204 to a step F208 to carry out the reproducing operation using the U-TOC sector 5 which is the ID demand sector. As described above, each track is managed in the ordinary manner while the reproduction-inhibition indicated data are contained in the U-TOC sector 5, and thus the reproduction can be performed in the completely ordinary manner in the original order, containing the reproduction-inhibition indicated data.

Through the above processing, the user can keep desired data secret with identification numbers, and can carry out the original reproduction by inputting the identification numbers.

When the reproduction-inhibition indication is partially performed on a disc, the reproduction is performed while only the reproduction-inhibition indicated portion is jumped if no identification number is input. However, by inputting an identification number, the reproduction-inhibition indicated portion is also reproduced in accordance with the original time order. Therefore, this system is suitably used for a case where a part of data such as a movie is inhibited from being reproduced.

In a case where the used disc is the intermixed compatible disc on which the video data portion is managed as a defect area in the U-TOC sector 0 and the reproduction of only audio data is executed by the disc recording and/or reproducing apparatus shown in FIG. 2, the U-TOC sector 0 is also used in this system, and thus it is considered that only the audio data of the data portion for which the reproduction inhibition is indicated in the U-TOC sector 6 may be reproduced. Therefore, when the reproduction inhibition is indicated, the segments for the audio data of the reproduction-inhibition indicated data portion may be edited to a defect area together with video data in the U-TOC sector 0, or may be set as a area which is never managed and has no linkage from any table pointer on the U-TOC sector 0

Further, in order to keep higher secrecy, as described as a modification of the above system, it may be adopted that the identification information on a disc having reproduction-inhibition indicated data is kept using a custom file or disc ID by the disc recording and/or reproducing apparatus, and the reproduction-inhibition indicated data is reproduced by only the disc recording and/or reproducing apparatus only when an identification number is input.

When still higher secrecy is required, as described as a modification of the above system, an identification number is written in the U-TOC of the disc, and at the reproduction time the identification number read in from the U-TOC and the identification number input by the user are compared with each other. In this case, the reproducing operation is carried out using the U-TOC sector 5 (ID demand sector) only when these identification numbers are coincident with each other.

Further, for the read-only type optical disc, at the disc manufacturing time, a prescribed area is managed as a defect area in th P-TOC sector 6 or 0, and the P-TOC sector 5 is used as the ID demand sector.

The ID demand sector is not necessarily generated using the sector 5 in the U-TOC or P-TOC, and it may be generated using a sector 7, for example.

The above description is made to the video/audio data structure and the disc recording and/or reproducing apparatus with which compatibility is satisfied between the disc recording and/or reproducing apparatus usable for video/audio shown in FIG. 1 and the disc recording and/or reproducing apparatus usable for audio shown in FIG. 2, and subsequently made to the system for realizing reproduction-inhibition indicated data which can be adopted in different kinds of discs such as the intermixed compatible disc, the audio disc and the intermixed incompatible disc. However, various modifications may be made to the above embodiment as a system for realizing the reproduction-inhibition indicated data.

The above embodiment is described in view of the reproduction inhibition, however, a recording inhibition system, that is, a system in which data rewriting is possible only at the ID input time can be realized by the same system as described above.

Further, in the above embodiment, the disc recording and/or reproducing apparatus is a recording and reproducing apparatus, however, it may be applied to a read-only type apparatus or a write-only type apparatus.

Further, in this invention, the system added with video data which are recorded and reproduced simultaneously with audio data is described. As an application of this invention, a system in which the recording and reproducing operation is carried out while audio data of two channels (center and rear) are added to L and R audio data can be realized. When video data are added, a still picture (not moving picture) may be recorded and reproduced, thereby realizing a system such as a still camera in which a simultaneous audio reproducing operation can be performed.

What is claimed is:

1. A recording medium comprising:

a recording area in which either only audio data or an intermixture of audio data and video data are recorded;

a first management data area stored with first management data for permitting a recording or reproducing operation of the audio data for said recording area and inhibiting a reproducing or recording operation of the video data when only the audio data are to be recorded in or reproduced from said recording area; and a second management data area stored with second management data for permitting a recording or reproducing operation of the intermixture of the audio data and the video data for said recording area when both of the audio data and the video data are to be recorded in or reproduced from said recording area.

2. The recording medium according to claim 1, wherein said first management data area is stored with identification data indicating whether or not said second management data area is present.

3. The recording medium according to claim 1, wherein said first management data area and said second management data area are recorded at an inner side of a recording area on which the video data and the audio data are recorded.

4. A recording medium according to claim 1, wherein the first management data comprises at least a management table for the audio data and at least a management table for a defective area and the reproducing or recording operation of the video data are inhibited in accordance with the management table for the defective area.

5. A disc-shaped recording medium comprising:

a recording area in which either only compressed audio data or an intermixture of compressed audio data and compressed video data are recorded;

a first management data area stored with first management data for permitting a recording or reproducing operation of the audio data for said recording area and inhibiting a reproducing or recording operation of the intermixture of the audio data and the video data so that the audio data output and expanded when only the audio data are to be recorded in or reproduced from said recording area are continuously output; and a second management data area stored with second management data for permitting a recording or reproducing operation of the intermixed audio data and the video data and so that the intermixed audio data and the video data are continuously output and expanded.

6. The recording medium according to claim 5, wherein said first management data area is stored with identification data representing a use status of said second management data area.

7. The recording medium according to claim 5, wherein said first management data area and said second management data area are recorded at a position corresponding to an inner peripheral side of said recording area.

8. A recording and/or reproducing apparatus of a recording medium, said recording medium having a recording area in which either only audio data or an intermixture of audio data and video data are recorded, a first management data area stored with first management data for permitting a recording or reproducing operation of the audio data for said recording area and inhibiting a reproducing or recording operation of the video data when only the audio data are to be recorded in or reproduced from said recording area, and a second management data area stored with second management data for permitting a recording or reproducing operation of the intermixture of the audio data and the video data for said recording area when both of the audio data and the video data are to be recorded in or reproduced from said recording area, said apparatus comprising:

a first compandor for compressing input audio data and expanding audio data read out from the recording medium;

a second compandor for compressing input video data and expanding video data read out from the recording medium;

storing means for temporarily storing the audio data and the video data output from said first and second compandors and temporarily storing the audio data and the video data read out from the recording medium;

data transforming means for transforming each of the audio data and the video data read out from said storing means to recording data;

head means for recording the recording data supplied from said transforming means on the recording medium and reading out data recorded on the recording medium; and control means for controlling the recording or reproducing operation of said head means on or from the recording medium on the basis of the first management data and the second management data read out by said head means.

9. The recording and/or reproducing apparatus as claimed in claim 8, wherein when the control means judges on the basis of the first management data read out by said head means that the video data are recorded on the recording medium, said control means controls said head means on the basis of the second management data so as to continuously read out a portion of said recording area in which the video data are recorded, and a portion in which the audio data are recorded.

10. The recording and/or, reproducing apparatus according to claim 9, wherein when the control means judges on the basis of the first management data read out by the head means that only the audio data are recorded on the recording medium, said control means controls said head means on the basis of the first management data to read out only a portion of the recording area in which the audio data are recorded.

11. The recording and/or reproducing apparatus according to claim 8, wherein said control means includes a write-in/read-out controller for controlling a write-in operation of audio data and video data into said storing means and a read-out operation of audio data and video data from said storing means.

12. The recording and/or reproducing apparatus according to claim 8, wherein said control means includes an identification unit for identifying whether the data read out from said storing means are audio data or video data.

13. The recording and/or reproducing apparatus according to claim 8, wherein said control means controls the read-out operation of the recording medium by said head means on the basis of reproduction-inhibition data in the second management data.

14. The recording and/or reproducing apparatus according to claim 8, wherein said head means is supplied with the recording data corresponding to the audio data output from said data transforming means and the recording data corresponding to the video data while both of the recording data are subjected to time division.

15. A recording and/or reproducing apparatus of a recording medium, said recording medium having a recording area in which either only audio data or an intermixture of audio data and video data are recorded, a first management data area stored with first management data for permitting a recording or reproducing operation of the audio data for said recording area and inhibiting a reproducing or recording operation of the video data when only the audio data are to be recorded in or reproduced from said recording area, and a second management data area stored with second management data for permitting a recording or reproducing operation of the intermixture of the audio data and the video data for said recording area when both of the audio data and the video data are to be recorded in or reproduced from said recording area, the second management data including reproduction-inhibition data, said apparatus comprising:

a first compandor for compressing input audio data and expanding audio data read out from the recording medium;

a second compandor for compressing input video data and expanding video data read out from the recording medium;

storing means for temporarily storing the audio data and the video data output from said first and second compandors and temporarily storing the audio data and the video data read out from the recording medium;

data transforming means for transforming each of the audio data and the video data read out from said storing means to recording data;

head means for recording the recording data supplied from said transforming means on the recording medium and reading out data recorded on the recording medium; and control means which is supplied with the first and second management data read out by said head means for controlling the recording or reproducing operation for the recording medium by said head means on the basis of the first and second management data, to reproduce, on the basis of the first management data, only a portion of the recording area of the recording medium in which the audio data are recorded and to partially read out the recording area of the recording medium on the basis of the second management data and the reproduction-inhibition data of the second management data.

16. The recording and/or reproducing apparatus according to claim 15, further including input means, and wherein said control means compares data input from said input means with the reproduction-inhibition data, and if a comparison result indicates coincidence between the data input from said input means and the reproduction-inhibition data, said control means controls said head means to read out the whole recording area of the recording medium.

17. The recording and/or reproducing apparatus according to claim 14 further including display means which is controlled by said control means and displays a demand for data input through an input means.

18. A reproducing apparatus of a disc-shaped recording medium, said disc-shaped recording medium having a recording area in which either only audio data or an intermixture of audio data and video data are recorded, a first management data area stored with first management data for permitting a recording or reproducing operation of the audio data for said recording area and inhibiting a reproducing or recording operation of the video data when only the audio data are to be recorded in or reproduced from said recording area, and a second management data area stored with second management data for permitting a recording or reproducing operation of the intermixture of the audio data and the video data for said recording area when both of the audio data and the video data are to be recorded in or reproduced from said recording area, said apparatus comprising:

a head for reading data which are recorded on a disc-shaped recording medium with being compressed;

a decoder for decoding data read out by said head;

a memory for temporarily storing audio data and video data which are output from said decoder;

a first expander for expanding audio data output from said memory;

a second expander for expanding video data output from said memory; and a controller for controlling a reproducing operation of said recording medium by said head on the basis of the first and second management data read out by said head.

19. The reproducing apparatus according to claim 17, wherein when said controller judges on the basis of the first management data read out by said head that the video data are recorded on the disc-shaped recording medium, said controller controls said head on the basis of the second management data to continuously read out a portion of the recording area in which the video data are recorded, and a portion in which the audio data are recorded.

20. The reproducing apparatus according to claim 19, wherein when said controller judges on the basis of the first management data read out by said head that only the audio data are recorded on the disc-shaped recording medium, said controller controls said head on the basis of the first management data to read out only a portion of the recording area in which the audio data are recorded.

21. The reproducing apparatus according to claim 18, wherein said controller includes a memory control unit for controlling a write-in operation of audio data and video data into said memory, and a read-out operation of audio data and video data from said memory.

22. The reproducing apparatus according to claim 18, wherein said controller includes an identification unit for identifying whether the data read out from said memory are audio data or video data.

23. The reproducing apparatus according to claim 18, wherein said controller controls the operation of said head to partially read out the recording area of the disc-shaped recording medium on the basis of reproduction-inhibition data of the second management data.

24. A reproducing method of a disc-shaped recording medium, said disc-shaped recording medium having a recording area in which either only audio data or an intermixture of audio data and video data are recorded, a first management data area stored with first management data for permitting a recording or reproducing operation of the audio data for said recording area and inhibiting a reproducing or recording operation of the video data when only the audio data are to be recorded in or reproduced from said recording area, and a second management data area stored with second management data for permitting a recording or reproducing operation of the intermixture of the audio data and the video data for said recording area when both of the audio data and the video data are to be recorded in or reproduced from said recording area, said reproducing method comprising the steps of:

reading out the first management data from the disc-shaped recording medium;

judging on the basis of the read out first management data whether the second management data exists; and continuously reading out on the basis of the second management data a portion of the recording area in which video data are recorded and a portion in which audio data are recorded if the second management data is judged to exist.

25. The reproducing method according to 24, wherein if the existence of the second management data is judged not to exist on the basis of the first management data read out, then reading out only the portion of the recording area in which the audio data are recorded on the basis of the first management data.

26. The reproducing method according to claim 24, wherein if it is judged that reproduction-inhibition data are recorded in the second management data, partially reading out data from the recording area of the disc-shaped recording medium on the basis of the second management data and the reproduction-inhibition data of the second management data.

27. The reproducing method according to claim 24, further comprising the steps of comparing input data from input means with reproduction-inhibition data of the second management data and reading out the whole recording area of the recording medium if a comparison result indicates coincidence between the input data from the input means and the reproduction-inhibition data.

28. A recording method of a disc-shaped recording medium, said disc-shaped recording medium having a recording area in which either only audio data or an intermixture of audio data and video data are recorded, a first management data area stored with first management data for permitting a recording or reproducing operation of the audio data for said recording area and inhibiting a reproducing or recording operation of the video data when only the audio data are to be recorded in or reproduced from said recording area, and a second management data area stored with second management data for permitting a recording or reproducing operation of the intermixture of the audio data and the video data for said recording area when both of the audio data and the video data are to be recorded in or reproduced from said recording area, said recording method comprising the steps of:

manually inputting inhibit data;

incorporating data, which serve to inhibit the reproduction of a specific portion in the recording area of the disc-shaped recording medium, into the second management data;

storing the second management data in a memory together with the first management data;

recording the first and second management data read out from the memory into the first and second management data areas, respectively; and performing a rewrite operation of defect management data of the second management data stored in the memory on the basis of the inhibit data.

29. A recording medium comprising:

a recording area on which at least a video program and at least an audio program corresponding to the video program are recorded;

a first management data area recorded with first management data for permitting a reproducing or recording operation of the audio program and inhibiting a reproducing or recording operation of the video program; and a second management data area recorded with second management data for permitting a reproducing or recording operation of the video program and the audio program corresponding to the video program.

30. A recording medium according to claim 29, wherein the first management data area is recorded with identification data for the purpose of determining whether the second management data area is present or not.

31. A recording medium according to claim 29, wherein the first management area and the second management data area are recorded at an inner side of the recording area on which the video programs and audio programs are recorded.

32. A reproducing method of disc-shaped recording medium, the disc-shaped recording medium having a recording area in which at least a video program and at least an audio program corresponding to the video program are recorded, a first management data area recorded with first management data for permitting a reproducing or recording operation of the audio program and inhibiting a reproducing or recording operation of the video program, and a second management data area recorded with second management data for permitting a reproducing or recording operation of the video program and the audio program corresponding to the video program, the reproducing method comprising the steps of:

reading out the first management data from the disc-shaped recording medium;

judging on the basis of the read out first management data whether the second management data exists or not; and continuously reading out from a portion of the recording area in which a video program is recorded and a portion of the recording area in which an audio program is recorded in accordance with the second management data, if the second management data is judged to exist.

* * * * *

UNITED STATES PATENT AND TRADEMARK OFFICE

CERTIFICATE OF CORRECTION

PATENT NO. : 6,249,641 B1
DATED : June 19, 2001
INVENTOR(S) : Teppei Yokota

It is certified that error appears in the above-identified patent and that said Letters Patent is hereby corrected as shown below:

Column 2,
Line 21, insert -- with -- between only and compressed;

Column 3,
Line 13, delete "both of the" and insert -- the intermixed --;
Line 15, insert -- compressed -- between out and data;
Line 17, delete "with being compressed";
Line 18, delete "video" and insert -- audio --;
Line 26, insert -- further -- between is and provided;
Line 29, insert -- an -- between or and intermixture;

Column 15,
Line 4, insert -- a -- between and and subsequent;
Line 50, delete "sing" and insert -- using --;

Column 16,
Line 34, delete "amp" and insert -- $A_{MD}$ --;

Column 17,
Lines 7-8, delete "$V_{ssi\ h}$" and insert -- $V_{sh}$ --;
Line 9, delete "$V_{ssi\ h}$" and insert -- $V_{sh}$ --;

Column 27,
Line 47, delete "th" and insert -- the --;

Column 28,
Lines 22, 24, 28, 52, 54 and 60, delete "a";
Lines 22, 24, 28, 52, 54 and 60, delete "or" and insert -- and --;
Lines 22, 23, 24, 29, 53, 54 and 61, delete "operation";

Column 29,
Lines 9, 11 and 15, delete "a";
Lines 10, 11 and 15, delete "or" and insert -- and --;
Lines 10, 12 and 16, delete "operation";

Column 30,
Lines 16, 18 and 22, delete "a";
Lines 17, 18 and 22, delete "or" and insert -- and --;
Lines 17, 19 and 23, delete "operation";
Line 65, delete "14" and insert -- 15 --;

UNITED STATES PATENT AND TRADEMARK OFFICE

CERTIFICATE OF CORRECTION

PATENT NO. : 6,249,641 B1

DATED : June 19, 2001
INVENTOR(S) : Teppei Yokota

It is certified that error appears in the above-identified patent and that said Letters Patent is hereby corrected as shown below:

<u>Column 31,</u>
Lines 6, 7, 11, 63 and 64, delete "a";
Lines 6, 7, 11, 63 and 64, delete "or" and insert -- and --;
Lines 6, 8, 12, 63 and 65, delete "operation";

<u>Column 32,</u>
Lines 1, 40, 41 and 45, delete "a";
Lines 1, 40, 41 and 45, delete "or" and insert -- and --;
Lines 2, 40, 42 and 46, delete "operation";
Line 28, delete "24" and insert -- 26 --;

<u>Column 33,</u>
Lines 2, 3 and 7, delete "a";
Lines 2, 4 and 7, delete "or" and insert -- and --;
Lines 3, 4 and 8, delete "operation";

<u>Column 34,</u>
Lines 2, 3 and 6, delete "a";
Lines 2, 4 and 6, delete "or" and insert -- and --;
Lines 3, 4 and 6, delete "operation"

Signed and Sealed this

Thirteenth Day of May, 2003

JAMES E. ROGAN
*Director of the United States Patent and Trademark Office*